(12) United States Patent
Watts et al.

(10) Patent No.: US 11,790,326 B2
(45) Date of Patent: Oct. 17, 2023

(54) SYSTEMS AND METHODS FOR REPAIR OF VEHICLE BODY DAMAGE

(71) Applicants: Robert Lee Watts, Etowah, TN (US); Nathan Michael Watts, Athens, TN (US)

(72) Inventors: Robert Lee Watts, Etowah, TN (US); Nathan Michael Watts, Athens, TN (US)

( * ) Notice: Subject to any disclaimer, the term of this patent is extended or adjusted under 35 U.S.C. 154(b) by 0 days.

(21) Appl. No.: 17/487,875

(22) Filed: Sep. 28, 2021

(65) Prior Publication Data
US 2022/0114561 A1    Apr. 14, 2022

Related U.S. Application Data

(63) Continuation-in-part of application No. 16/735,344, filed on Jan. 6, 2020, now Pat. No. 11,130,477.

(60) Provisional application No. 62/788,584, filed on Jan. 4, 2019.

(51) Int. Cl.
G06Q 10/00     (2023.01)
G06Q 10/20     (2023.01)

(52) U.S. Cl.
CPC .................................. G06Q 10/20 (2013.01)

(58) Field of Classification Search
CPC ........................................................ G06Q 10/20
See application file for complete search history.

(56) References Cited

U.S. PATENT DOCUMENTS

| | | | | |
|---|---|---|---|---|
| 9,189,960 | B2 * | 11/2015 | Couch | G08G 1/168 |
| 11,144,889 | B2 * | 10/2021 | Li | G06T 7/001 |
| 2012/0076437 | A1 * | 3/2012 | King | G06Q 40/08 |
| | | | | 382/286 |
| 2012/0297337 | A1 * | 11/2012 | St. Denis | G06Q 30/0613 |
| | | | | 705/305 |
| 2015/0206023 | A1 * | 7/2015 | Kochi | G06T 17/10 |
| | | | | 382/199 |
| 2015/0269792 | A1 * | 9/2015 | Wood | G07C 5/006 |
| | | | | 901/44 |
| 2017/0148102 | A1 * | 5/2017 | Franke | G06Q 30/0601 |
| 2018/0260793 | A1 * | 9/2018 | Li | G06Q 40/08 |
| 2019/0279440 | A1 * | 9/2019 | Ricci | H04W 4/48 |
| 2020/0074178 | A1 * | 3/2020 | Guo | G06V 20/00 |

FOREIGN PATENT DOCUMENTS

WO    WO2017195228 A1 * 10/2016

OTHER PUBLICATIONS

Patent Cooperation Treaty, International Search Report, Form PCT/ISA/220, dated Nov. 17, 2022.

* cited by examiner

*Primary Examiner* — Frederick M Brushaber
(74) *Attorney, Agent, or Firm* — Pitts & Lake P.C.

(57) ABSTRACT

Systems and methods of repairing damage to the body structure of a vehicle based on a comparison of vehicle damage to vehicle specification data to indicate the magnitude and direction of vehicle damage to formulate a repair plan for review.

16 Claims, 12 Drawing Sheets

SYSTEMS AND METHODS FOR REPAIR OF VEHICLE BODY DAMAGE

CROSS-REFERENCE TO RELATED APPLICATIONS

This application is a continuation-in-part of U.S. patent application Ser. No. 16/735,344, filed on Jan. 6, 2020, which claimed the benefit of U.S. Provisional Application No. 62/788,584, filed on Jan. 4, 2019, the contents of which are hereby incorporated herein in their entirety by reference.

BACKGROUND

Automobiles are often involved in accidents or are damaged by objects such as shopping carts, rocks, road hazards, etc. This damage usually affects portions of the automobile upper body, and in severe cases, may extend to the chassis and frame as well. In order to properly repair this damage, collision repair shops must have the information and equipment required to repair any portion of the entire automobile, including the upper body, which contains openings for the windows, doors, etc. as well as for the sensors used for vehicle safety systems. Such repair includes ensuring that all openings are aligned correctly with each other and with the overall automobile body, and that all safety sensors are correctly positioned and calibrated. Due to the multitude of parts, body openings, and attachments (such as installed or mounted sensors), the process of ensuring both local and overall (global) correct alignment of an automobile's body components can be an expensive, complicated, and time consuming process.

Further, modern automotive design is rapidly moving toward semi-autonomous or autonomous (i.e., effectively self-driving) vehicles. Some first steps in this process are already being implemented by the OEMs through the integration of electronic safety systems to assist and protect drivers. For example, vehicles now commonly have advanced safety and monitoring features such as automatic braking, lane departure alerts, blind spot warnings, and other technological systems aimed at minimizing driver mistakes and improving safety. As drivers begin to rely more heavily on these assistive safety features, it is imperative that the systems and components be properly aligned, calibrated and that they function correctly.

One challenge of measuring upper body configurations for repair is that current measuring devices (i.e., single point lasers, measuring gauges, and tape measures) are limited to measuring straight line distances. This can be a disadvantage, as in current automotive design, very few surfaces are flat, due to curvature of body panels utilized for aesthetic purposes, as well as a desire to enhance vehicle aerodynamics to improve fuel economy. Currently OEM data for upper body components is limited to a small collection of straight-line drawings used for measuring openings for windows, doors, trunk, engine compartment etc. These drawings are stand alone and are not shown in any type format/configuration that defines them with a spatial relationship to each other.

Thus, systems and methods are needed for more efficiently enabling the repair and proper alignment of a vehicle and its component parts, sensors, openings, and attachments. Embodiments of the invention are directed toward solving these and other problems individually and collectively.

BRIEF SUMMARY

The terms "embodiments of the invention", "invention," "the invention," "the inventive" and "the present invention" as used herein are intended to refer broadly to all the subject matter described in this document and to the claims. Statements containing these terms should be understood not to limit the subject matter described herein or to limit the meaning or scope of the claims. The embodiments described herein are defined by the claims and not by this summary. This summary is a high-level overview of various aspects of the embodiments and introduces some of the concepts that are further described in the Detailed Description section below. This summary is not intended to identify key, required or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems, apparatuses, and methods for enabling the repair of upper body damage to automobiles. In one embodiment, the invention enables this repair by using a combination of a 3D scanner apparatus in conjunction with specific data processing steps that can be used to build a data set containing specifications for a specific vehicle or set of comparable vehicles.

Other objects and advantages of the present invention will be apparent to one of ordinary skill in the art upon review of the detailed description of the present invention and the included figures. For example, embodiments of the present general inventive concept can be achieved by systems and methods adapted for taking upper body specifications, sensor locations, upper body control points, and relating them numerically and dimensionally to underbody (frame) dimensions. Using underbody points have been well-known for years in the art, but until now there has been no efficient, practical, economic, or feasible way to produce a holistic view of the entire vehicle in a manner that will allow the values to be used in a documented repair process.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
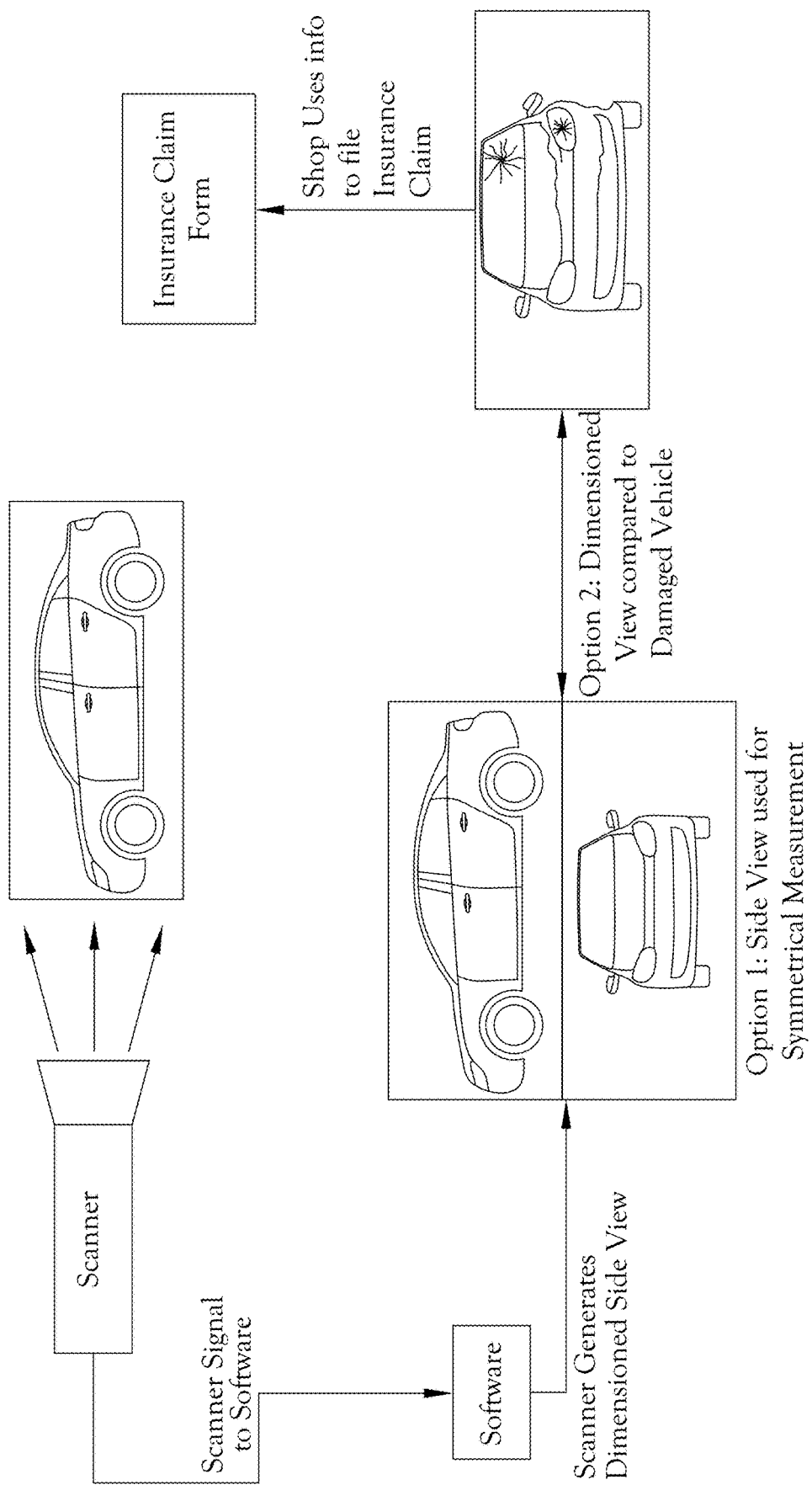
FIG. 1 is a diagram illustrating the primary elements, stages, processes, functions, or components of an embodiment of a system and methods for the repair of Automobile Upper Body Damage.

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the invention may be practiced. The invention may, however, be embodied in many different forms and should not be construed as limited to the embodiments set forth herein; rather, these embodiments are provided so that this disclosure will satisfy the statutory requirements and convey the scope of the invention to those skilled in the art. Accordingly, embodiments are not limited to the embodiments described herein or depicted in the drawings, and various embodiments and modifications can be made without departing from the scope of the claims presented.

Among other things, the present invention may be embodied in whole or in part as a system, as one or more methods, or as one or more devices. Embodiments of the invention may take the form of a hardware-implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, controller, etc.) that is part of a client device, server, network element, or other form of computing or data processing device/platform. The processing element or elements are programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array (PGA or FPGA), application specific integrated circuit (ASIC), or other known or later developed circuitry and the like, specifically configured and arranged to generate signals instructing the various components to carry out the data processing functions. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

One of the problems with current repair processes is that the available vehicle upper body data sets and drawings (including the positioning and orientation of sensors, attachments and openings) are in no way referenced to each other to provide a consolidated view of a vehicle's exterior upper body. However, embodiments of this invention enable a singular group of data point(s) (for example a window) and a reference for the window grouping to another grouping (for example to a driver door) to provide an image that depicts how the window should be located in the door for the driver's side of the vehicle. Embodiments of the inventive system allow groups of elements or components to systematically be linked to other groups of measured points until the complete upperbody is illustrated in one or more 3D models.

Embodiments of the present invention are directed to systems, apparatuses, and methods for more efficiently enabling the repair and proper alignment of a vehicle upper body in its entirety as well as its component parts, sensors, openings, and attachments.

As noted, the location of currently utilized safety devices (including sensors, such as cameras, LIDAR, radar components, etc.) is critical to their proper operation. An initial step in making certain that the vehicle and safety systems performance meets the required standards or operational requirements is that a sensor element or device must be positioned so that its field of view is as designed. For example, if a lane departure device cannot properly detect the white lane divider line, then it will not operate as intended and correctly alert the driver when the vehicle drifts out of the intended driving lane. Additionally, there are specific locations on an automobile body, such as front and rear bumpers, where sensors are "ganged together" in an assembly or array; this should provide overlapping fields of view and as a result, can provide detection across a broader expanse (such as a greater range, angular region, resolution, etc.) than a single sensor can monitor. It is not uncommon for front and rear bumpers to have 4 or 5 sensors deployed along the bumper as part of a protection system or feature. This arrangement may be critical to preventing an undetected object from being struck. For example, if there is a gap in the field of view between two sensors it would be possible for a slender object, such as a guard post or fire hydrant to "slip through the gap" and be struck by the auto without triggering the safety sensor alarm.

Unfortunately, there is currently no database available that contains sufficient placement specifications on the upper body safety sensors' mounting points for an automobile to provide a reference or data source for the sensor locations with respect to each other. For example, when repairing damage to a door opening, technicians typically have to physically measure the dimensions on a door opening and compare those to a single line sketch depicting what the door opening dimensions should be. These dimensions are taken from OEM drawings and serve only as a reference template. Thus, having a more complete database would make the repair process much less difficult, less expensive, and eliminate the potential for human measuring errors as well.

As is evident, now that the aforementioned sensor locations have become critical to maintain, the need for upper body specifications has become even more pronounced. However, due to limitations of currently used measuring devices there has been no efficient, accurate, and cost-effective method to produce such an upper body data set. However, embodiments of the proposed scanning method and system can not only measure straight line distances, but also have the ability to provide measurements which follow contoured surfaces. This capability is applicable (and often essential) to measuring areas such as the multiple sensors installed on a vehicle bumper, which may wrap around the curved end of a bumper or be mounted in/on a contoured bumper surface. With embodiments of the proposed 3D measuring technology, it is possible to scan and accurately locate multiple bumper sensors located on contoured surfaces in a reasonably short amount of time.

Example embodiments of the present general inventive concept can also be achieved to assist repairs when an automobile upper body database is not currently available. For example, until the recent advent of sensing devices associated with the movement toward improved vehicle safety, there has been no clear need for such a database, as repairs to the upper body of a vehicle were primarily done for cosmetic reasons. The criteria for acceptable upper body repairs were primarily if not solely subjective, such as straight seams between the hood and fenders or consistency of the gap around a door or trunk opening. However, with the implementation of safety sensors mounted in the upper body of automobiles, the need for specific location positions and dimensions is now becoming pronounced.

As is evident, now that the aforementioned sensor locations have become critical to maintain, the need for upper body specifications has become even more pronounced. However, due to limitations of currently used measuring devices there has been no efficient, accurate, and cost-effective method to produce such an upper body data set. However, embodiments of the proposed 3D structured light scanning method and system can not only measure straight line distances, but also has the ability to provide measurements which follow contoured surfaces. This capability is applicable (and often essential) to measuring areas such as the multiple sensors installed on a vehicle bumper, which may wrap around the curved end of a bumper or be mounted in/on a contoured bumper surface. With embodiments of the proposed 3D measuring technology, it would be possible to scan and accurately locate multiple bumper sensors located on contoured surfaces in a reasonably short amount of time.

Additionally, the complex designs of modern vehicles can mean critical control points are not only located above the frame and on the upper body, but can be located inside the passenger compartment of the vehicle as well. An example of this "inside passenger compartment" location would be a retractable hard top, where the rails, for storing the vehicle's top in retracted position, are located behind the passenger and driver seats. Unfortunately, current technology cannot adequately measure this type of control or reference points. In contrast, embodiments of the proposed 3D structured light measuring system described herein are fully capable of measuring points located in such positions, both individually and with respect to other points outside the passenger compartment.

Additionally, the complex designs of modern vehicles can mean critical control points are not only located above the frame and on the upper body, but can be located inside the passenger compartment of the vehicle as well. An example of this "inside passenger compartment" location would be a retractable hard top, where the rails, for storing the vehicle's top in retracted position, are located behind the passenger and driver seats. Unfortunately, current technology cannot adequately measure these types of control or reference points. In contrast, embodiments of the proposed 3D structured light measuring system described herein are fully capable of measuring points located in such positions, both individually and with respect to other points outside the passenger compartment.

Embodiments of the proposed scanner system and methods provide a defined process to analyze and repair upper body sections in the absence of a detailed data set or specification. In one embodiment, this type of repair is made by a process termed a symmetrical measuring comparison. If repairing a vehicle without a specification, an embodiment of the 3D scanning process will allow dimensions to be taken from an undamaged side of a vehicle and used to compare to the opposite side of the same vehicle to maintain symmetry. The 3D scanner can be set to capture either straight line dimensions between target control points or adjusted to present distances, taking into consideration surface contours. This is an important capability, as surface dimensions can vary significantly from straight line dimensions between the same two points.

The 3D structured light scanning methodology and technologies described herein enable data to be gathered from an undamaged vehicle and compiled into a database to be used for the correct placement of these critical points when a vehicle is being repaired. The "upper body database" is then incorporated into a software system which, after scanning a damaged vehicle, would be used to compare control point locations and positions in space relative to the correct placement of those points on the control automobile body dimensions provided in the database. The results of the comparison would be displayed visually and any displacement documented numerically as well, so that both the degree and direction of damage can be assessed as a repair plan is developed and executed.

However, there is a problem in that at present none of the vehicles currently on the road have suitable upper body specification data sets available to a repair shop; thus, there is need for a method to repair these vehicles even in the absence of a database. As recognized by the inventor, this problem can be addressed by a process known as symmetrical measuring. In the "no upper body data" scenario, symmetrical measuring may be utilized; that is, the undamaged side of a vehicle may be scanned and used to generate a template image. The template image from the undamaged side of the vehicle can then be "mirror imaged" by appropriate software operations. In the next step, a scan of the damaged side of the vehicle is taken. The "mirror image" of the undamaged side of the vehicle is then overlaid by the software onto the scan of the damaged side. The software can instruct the componentry to display a colorized image depicting the magnitude and direction of damage in a very similar manner to a comparison against dimensional specifications in the database. While this methodology works sufficiently well for a repair, it is time consuming because both the damaged and undamaged sides of the car have to be scanned. Additionally, note that in a direct hit to the front or back of a vehicle, there may not remain an undamaged portion that can be used as a basis for comparison for achieving symmetry.

The specifications gathered in the currently utilized approach to underbody database construction are at best representative of only one undamaged/new vehicle (as a dealer is contacted and a new vehicle may be transported to a measuring facility). This is a commonly accepted practice in the industry. However, considering the number of vehicles of any model produced, and the fact that the same model is produced at more than one facility, a single vehicle's dimensions do not provide a reasonable statistical sample size. In contrast, embodiments of the inventive system and methods would allow measurements to be taken during the build/manufacturing process on the assembly line. The information collected via "in process scanning" could be used in several different ways, as described in greater detail below.

So far, the discussion has included the possibility of capturing undamaged vehicle measurements on completely assembled vehicles procured from a car dealership. However, note that embodiments of the proposed invention have the capability to take measurements of any aspect of the vehicle during the production process. Typically, to take measurements in the production line it would be necessary to use more than one scanner at the same time.

To fully scan the underbody, upperbody or any other full surface on an automobile, multiple scanners would be required. Each scanner would have its own field of view (FOV) and this field of view would overlap by approximately 20% the view of a structured light scanner on either side (the adjacent scanners). In the case of an end scanner, it would only overlap the view of one scanner, on the side closest to the middle of the array. Having an overlap in fields of view provides common points of reference for each scanner to its adjoining scanner. This would allow the field of view to appear as one continuous scan rather than several individual scans.

The array of structured light scanners can be fixed at a convenient point along the manufacturing assembly line and positioned so that a scan of the array can cover the entire surface of the vehicle presented. In this way, the movement of the vehicle body along the assembly line can provide the motion necessary to scan the length & width of the vehicle. Field tests have proven this scanning could be performed with an accuracy of 1 mm or less at up to a maximum of 2 feet per second speed of the production line. Normal speed of an automotive production line is significantly less than 2 feet per second.

In general, these measurements are taken with respect to two imaginary reference lines. One line is considered to be running lengthwise down the center of the vehicle and a second reference line runs across the width of the vehicle at midpoint between front and rear. Using these two lines, an X, Y coordinate system can be established to describe the location of each measured point relative to these reference lines.

Collecting data during the build process can be implemented as follows. The normal viewing area of a scanner is not typically sufficient to scan the underbody of a vehicle as it moves down the production line. However, it is possible to "gang" several of the scanners together and scan the entire underbody in a single pass. This is done by having a known or determinable degree of "overlap" in the field of view for each scanner relative to the adjacent scanner(s). By virtue of this overlap, a composite of the entire vehicle can be accurately measured in a single pass. This can be done at a speed of up to 2 feet/second. This value was supplied by the manufacturer of the scanner and confirmed by field testing. A scanner should be capable of processing a vehicle at speed equal to or greater than that of an OEM production line; in most cases, an OEM would not slow the line in order to acquire data.

The gathered information can be used in multiple ways. First, the scan data could be associated with the VIN number of the vehicle scanned. Once tied to the VIN, it is possible not just to provide a specification for repair for a representative model, but to actually compare a damaged vehicle to its own unique dimensions at the time of manufacture. Second, the data from multiple vehicles can be compiled and statistically analyzed to provide a plurality of samples, which provides a much more acceptable sample size than the method currently used which involves measuring one vehicle only. The data gathered can be utilized by the OEM to monitor wear and tear on dies in the production process that can produce "fit error" and "stack up error" in the manufactured product (as described in greater detail below):

Sheet metal components utilized in modern automobile production are typically manufactured in a stamping process. Stamping involves taking a flat sheet of gauge sheet metal and forming it into a desired shape by bending it around a set of dies. Typically, the die stamping set has multiple steps to manufacture a component with all of the desired holes, slots, and contours required. Over time the dies used to produce the component wear. The wear on the dies can create an error in the part being fabricated that can cause it to deviate from the original design. The die wear occurs gradually and typically results in incrementally increasing departure from standard or desired sizes. Modern manufacturing techniques recognize this fact and engineering design allows for some degree of deviation in a part. However, at some point the part will not be within the tolerances required to mate with an adjacent panel or mounted mechanical component. This situation causes an error, and the failure is termed a "fit error";

Another type of error that can present a problem in volume manufacturing is that of "stack up error". Stack up error is caused when no single individual component is out of specification by an amount that makes it defective, but the total combined errors in a group of single parts makes the assembly or sub-assembly not adequate for its intended purpose.

By taking the measurements as part of the production line, the process of developing data will be streamlined and become much more accurate, as well as more efficient, thereby reducing costs. A 3D structured light scanner used as described herein will not only locate the reference points, but will also measure the dimensions of the slot, bolt, stud, or hole as the scan is taken. This approach/process would also eliminate the need to remove panels from the underside of the vehicle because the measurements can be taken prior to installation of the panels. Finally, the 3D scan should also eliminate the need for separate point recognition photographs, as the 3D image can be reliable and sufficient to aid a technician in identifying the points while under the car.

Figure 2A:
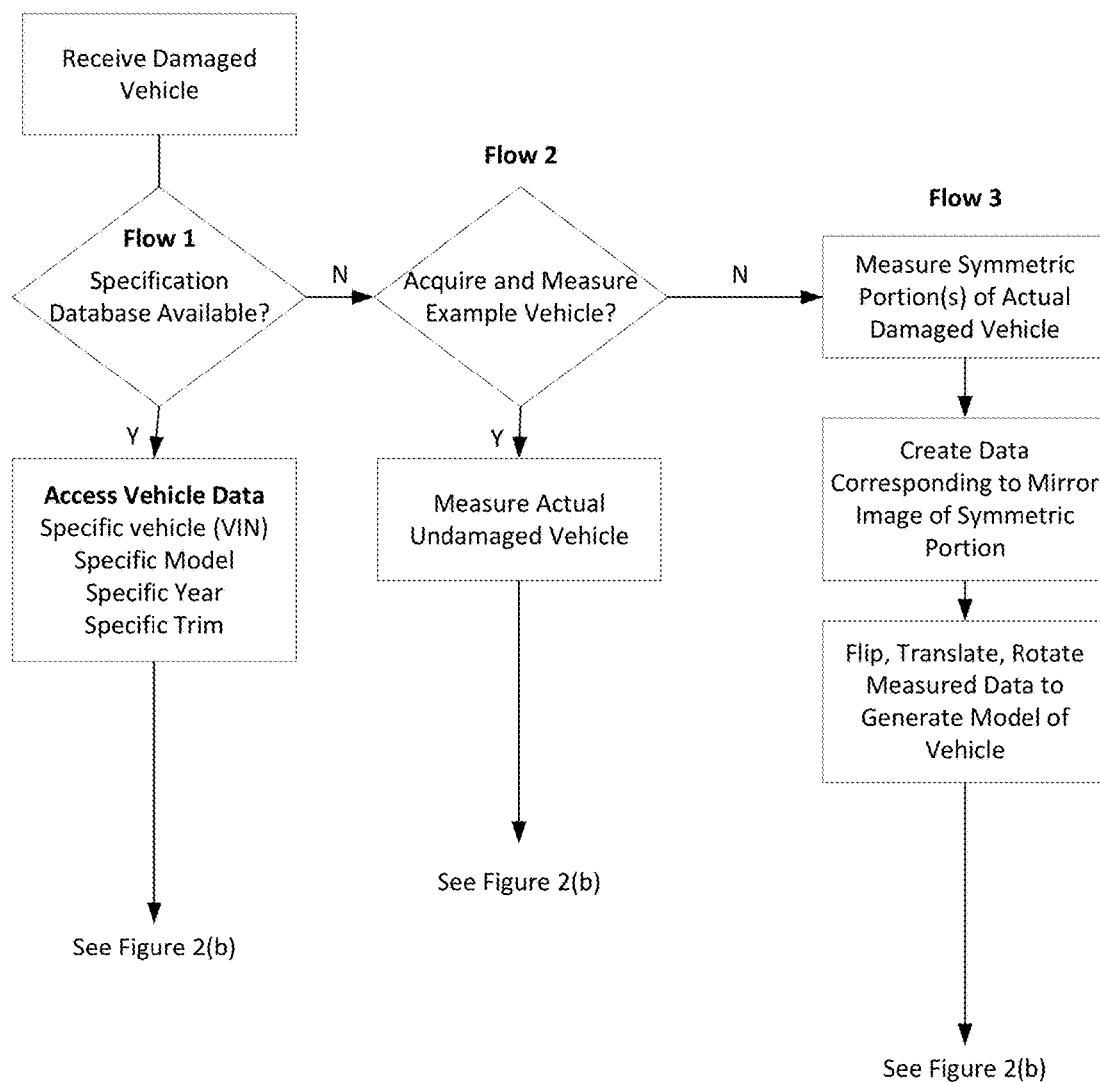
FIGS. 2(a) and 2(b) are flowcharts or flow diagrams illustrating steps or stages of a process, operation, function, or method for repairing a damaged vehicle in accordance with one or more embodiments of the inventive system and methods described herein.
Figure 2B:
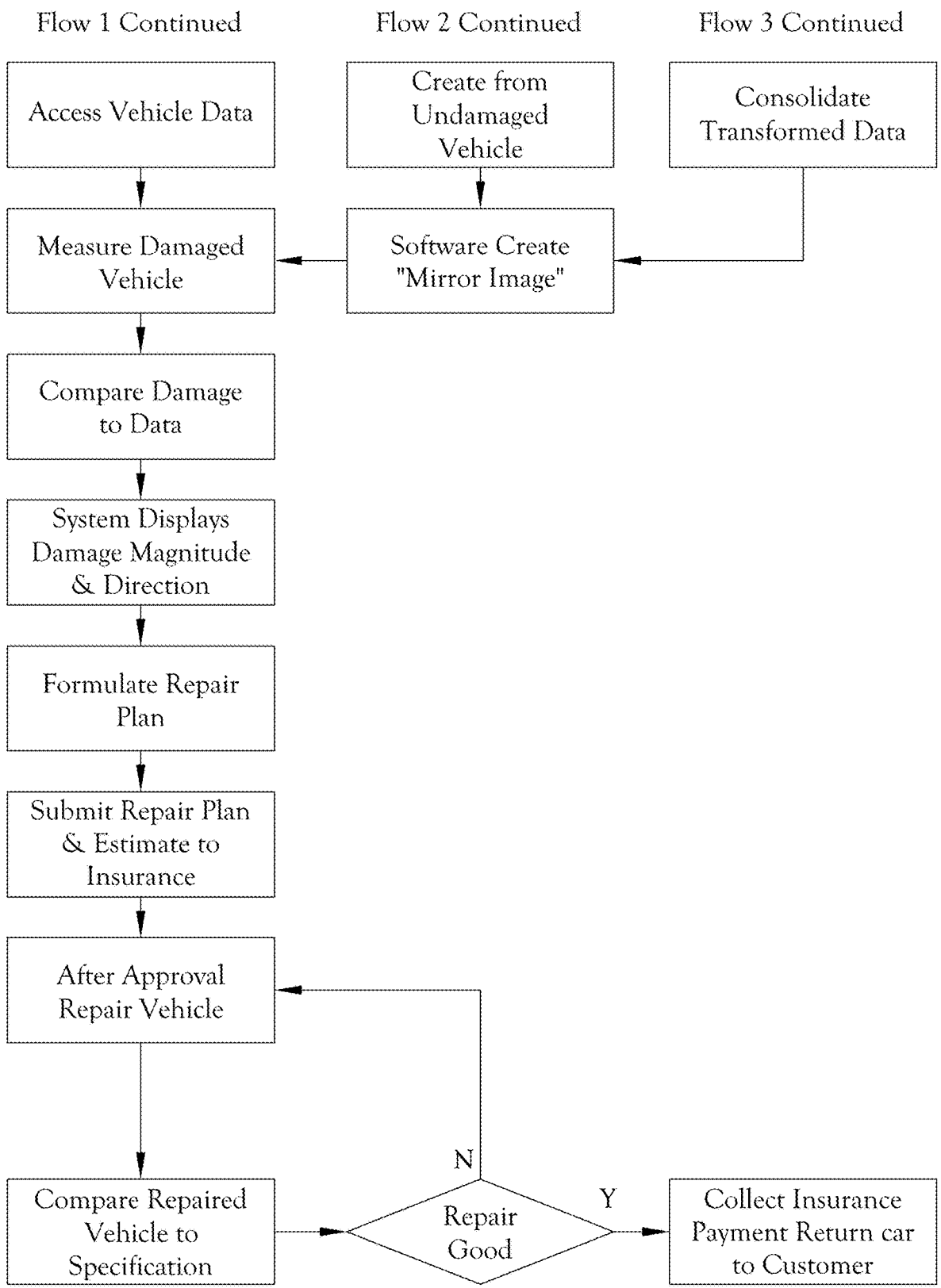
Figure 3:
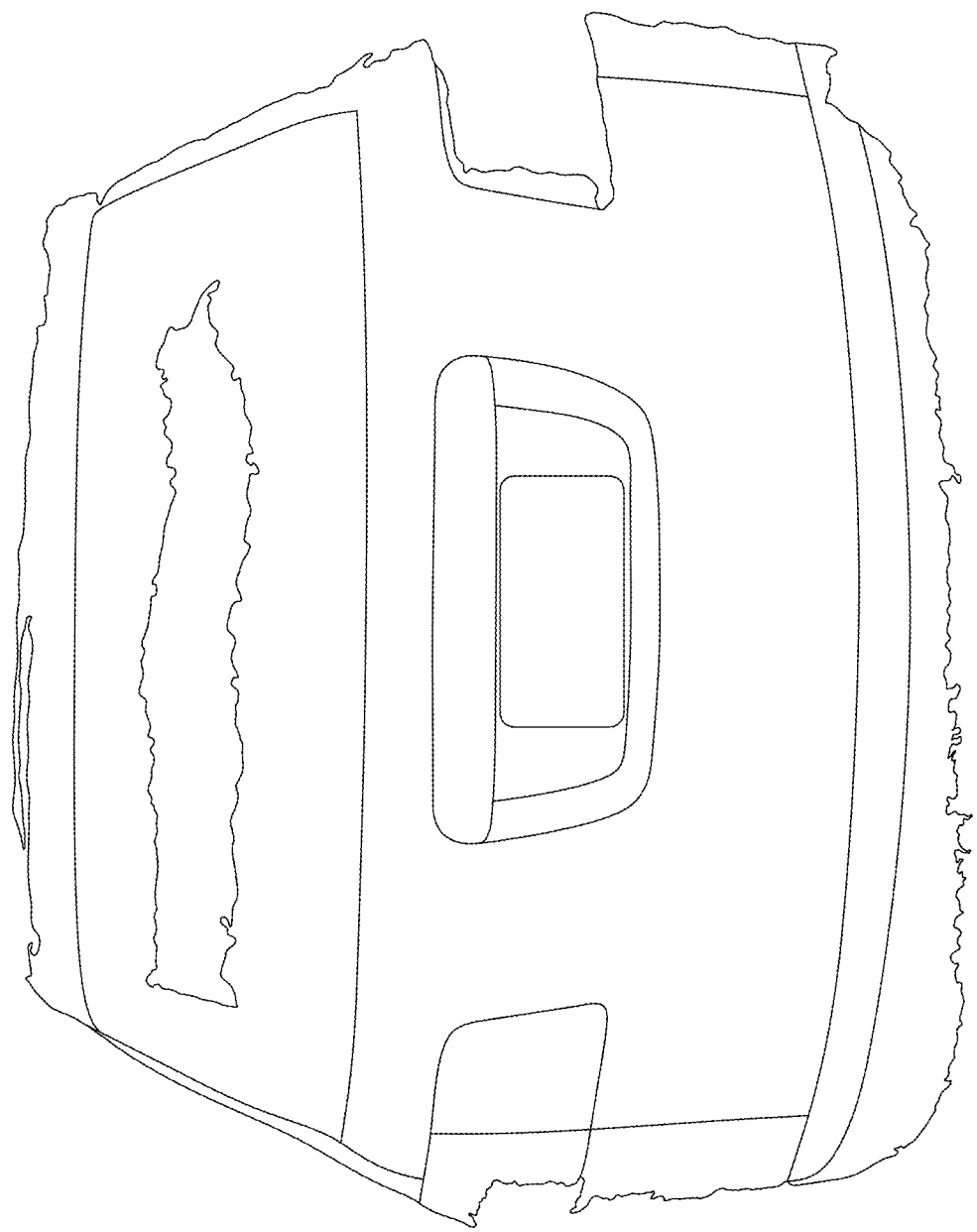
FIG. 3 is a diagram illustrating a damaged vehicle, showing its door and side panel(s), and that may be the subject of an embodiment of the inventive system and methods.
Figure 4:
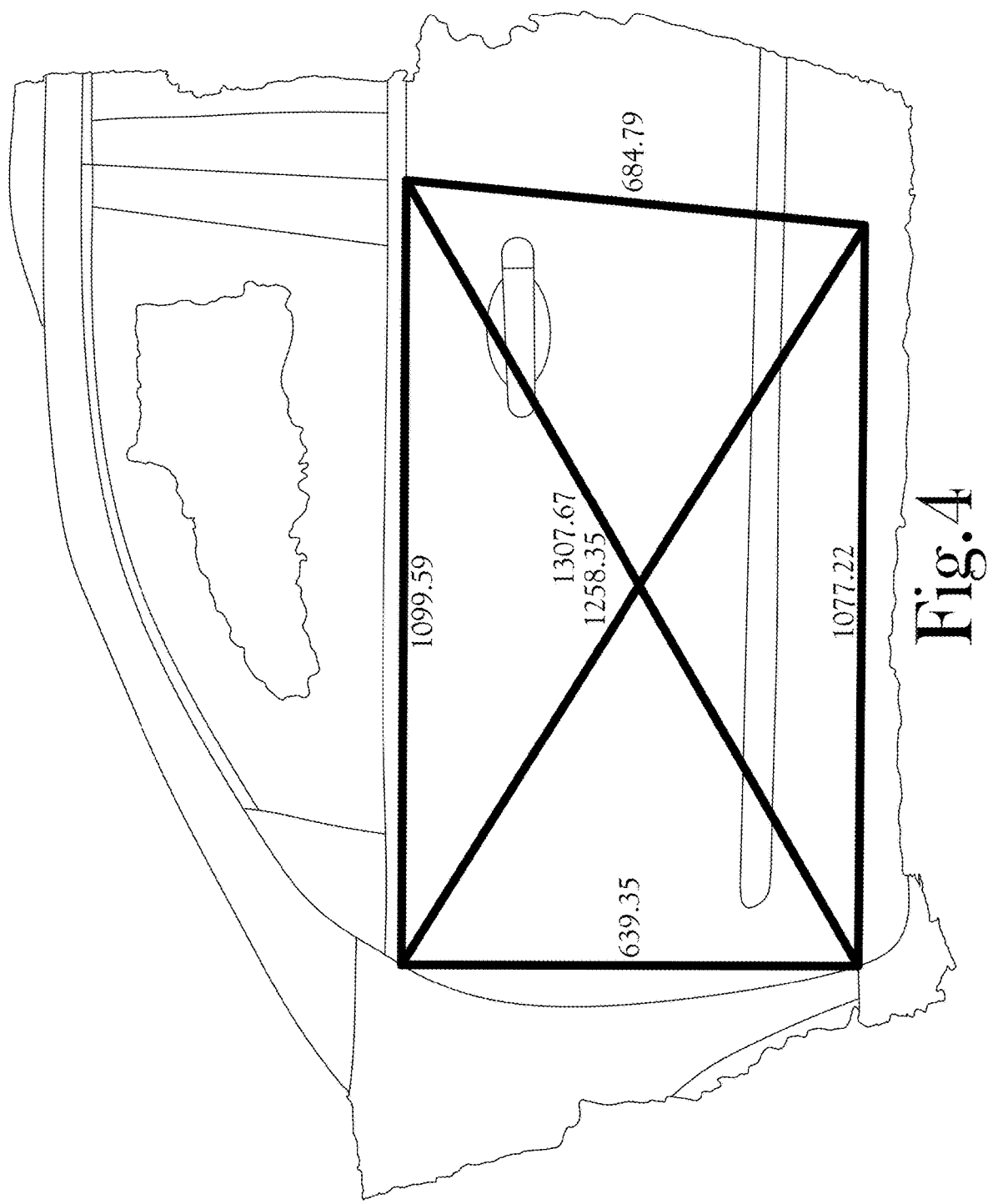
FIG. 4 is a diagram illustrating a set of measurements on a door of a damaged vehicle that may be made using one or more embodiments of the inventive system and methods described herein.
Figure 5:
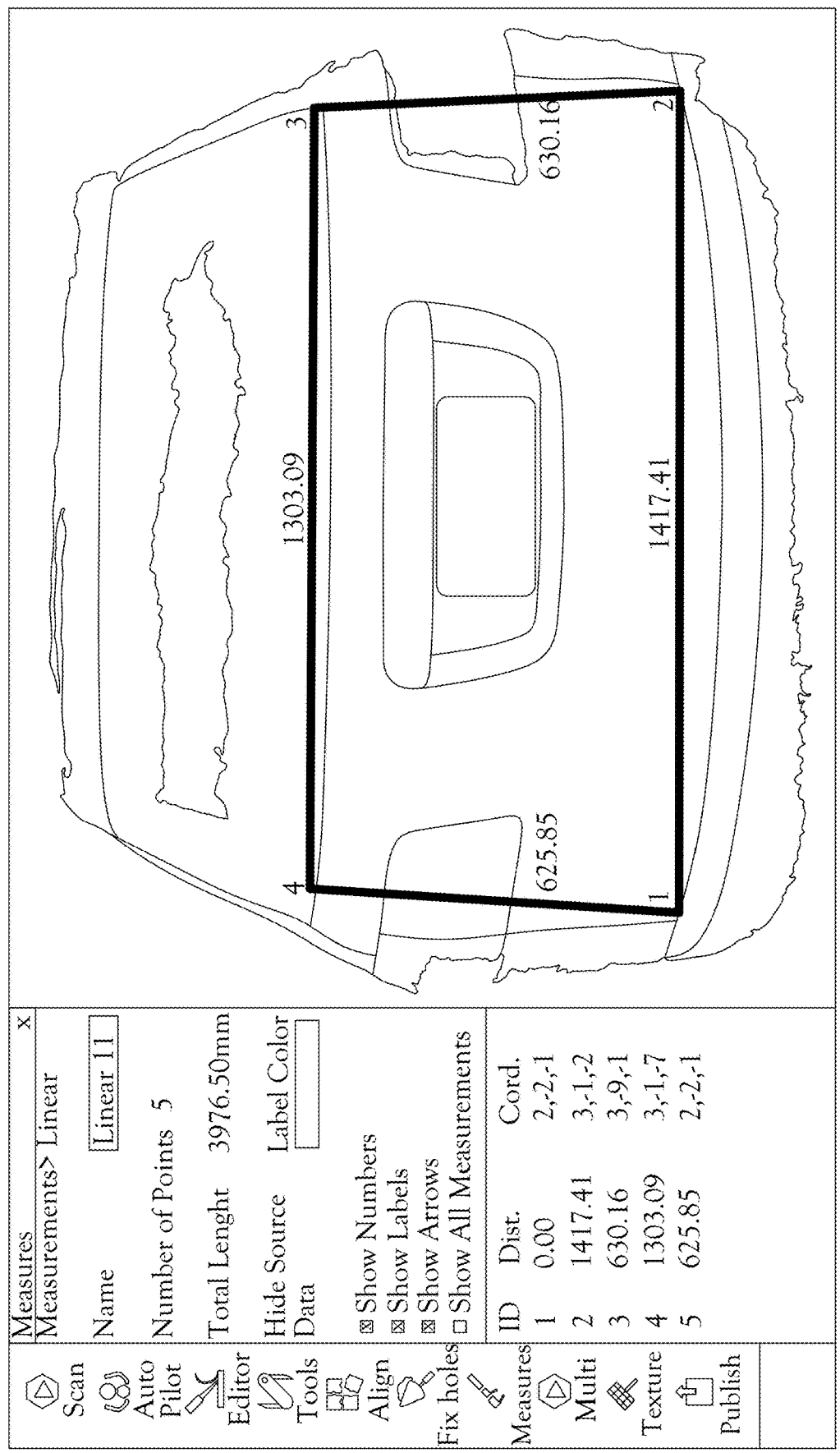
FIG. 5 is a diagram illustrating a set of measurements on a rear end of a damaged vehicle that may be made using one or more embodiments of the inventive system and methods described herein.

FIG. 1 is a diagram illustrating the primary elements, stages, processes, functions, or components of an embodiment of a system and methods for the repair of Automobile Upper Body Damage. FIGS. 2(a) and 2(b) are flowcharts or flow diagrams illustrating steps or stages of a process, operation, function, or method for repairing a damaged vehicle in accordance with one or more embodiments of the inventive system and methods described herein. FIG. 3 is a diagram illustrating a damaged vehicle, showing its door and side panel(s), and that may be the subject of an embodiment of the inventive system and methods. FIG. 4 is a diagram illustrating a set of measurements on a door of a damaged vehicle that may be made using one or more embodiments of the inventive system and methods described herein. FIG. 5 is a diagram illustrating a set of measurements on a rear end of a damaged vehicle that may be made using one or more embodiments of the inventive system and methods described herein. Further details regarding the diagrams and the operation of the systems and methods described herein may be found in the Appendix.

Figure 6:
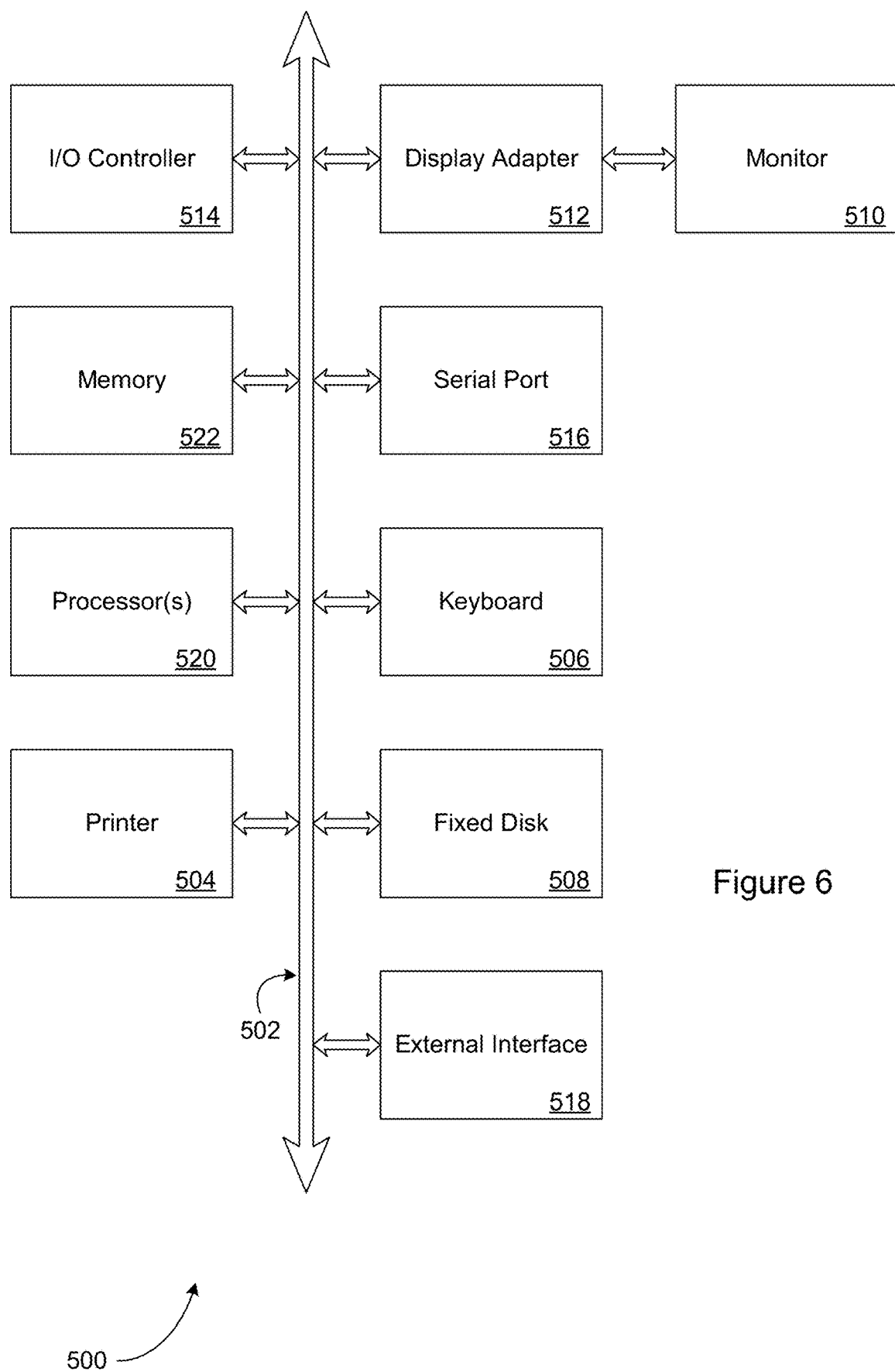
FIG. 6 is a diagram illustrating elements or components that may be present in a computer device or system configured to implement a method, process, function, or operation in accordance with an embodiment of the invention.

FIG. 6 is a diagram illustrating elements or components that may be present in a computer device or system configured to implement a method, process, function, or operation in accordance with an embodiment of the invention. As noted, in some embodiments, the system and methods described herein may be implemented in the form of an apparatus that includes a processing element and set of executable instructions. The executable instructions may be part of a software application and arranged into a software architecture. In general, an embodiment of the invention may be implemented using a set of software instructions that are designed to be executed by a suitably programmed processing element (such as a CPU, GPU (graphics processing unit), microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the system and methods described herein, such as for:

capturing and processing measurement data obtained from a 3D structured light scanner;
if available, accessing a vehicle upper body specification data base;
if needed, "mirroring" some or all of the captured data;
comparing the "mirrored" data to measurements for a damaged vehicle or portion of a vehicle; and
generating a display showing desired corrections for a damaged vehicle or portion of a vehicle.

Example embodiments of the present general inventive concept can also be achieved when data is not yet available for a statistically valid number of example vehicles or vehicle assemblies or sub-assemblies, and therefore the actual vehicle being repaired is used where possible to provide the baseline or correct measurements, orientations, alignments, etc. Note that as an alternative, or if the condition of the actual damaged vehicle is such that it cannot be used for measurements, then an option is to use an undamaged vehicle of the same year, make, model, etc. for purposes of making the measurements (this is similar to constructing a single vehicle specification database or dataset).

Embodiments of the present general inventive concept can also be applied when a database containing reference data for a statistically valid number of vehicles is available (presumably of the same relevant parameters or characteristics, such as one or more of the same year, frame, body, model, finish, accessory packages, etc.) as the vehicle being repaired. In the example embodiments, one or more 3D structured light scanning devices or apparatuses can used, such as an Artec EVA scanner, described at https://www.artec3d.com/.

At present, none of the vehicles currently on the road have an upper body specification data set available to a repair shop, so there is a need for a method to repair these vehicles even in the absence of a database. As recognized by the present inventors, this problem can be addressed by a process known as symmetrical measuring. In this process, the undamaged side of a vehicle may be scanned and used to generate a template image. The template image from the undamaged side of the vehicle will then be "mirror imaged" by appropriate software operations. In the next step, a scan of the damaged side of the vehicle is taken. The "mirror image" of the undamaged side of the vehicle is then overlaid by the software onto the scan of the damaged side. The software would then display a colorized image depicting the magnitude and direction of damage in a very similar manner to a comparison against dimensional specifications in the database. While this methodology works sufficiently well for a repair, it is time consuming because both the damaged and undamaged sides of the car have to be scanned. Additionally, note that in a direct hit to the front or back of a vehicle, there may not remain an undamaged portion that can be used as a basis for comparison for achieving symmetry.

To illustrate this, consider two different scenarios. In the first instance, a vehicle has struck a power pole on the right front, damaging the headlight and right front fender. In this case, the shop could scan the undamaged left side, mirror image that side, and then compare the undamaged side to the damaged side for preparing an estimate as well as for developing a repair plan. However, in a second scenario the vehicle has squarely struck a wall, severely damaging the entire front of the vehicle. In such an instance, the only way to produce a specification is to find a known undamaged vehicle of the same make, model, and trim to generate a specification. In most instances this would be inefficient, as it would slow down the operation until proper arrangements were made to have an undamaged vehicle measured offsite, in order to provide a comparison image and dimensions. In most cases such a delay is not acceptable to the customer wanting the vehicle repaired and back in service.

In this manner, embodiments of the proposed invention can provide critical information necessary to developing and executing a repair plan, in the absence of a suitable database. The information in the repair plan allows the collision repair facility to document damage for its proposal to the insurance company. The information contained in the proposal would display the damage in visual and numerical formats. This information or report would allow insurance adjusters to assess the damage repair proposal for compensation purposes. However, note that this is not the optimum solution due the unacceptable wait time if a repair shop has to locate a vehicle, negotiate a price to pay for taking the vehicle off site, and then actually make a symmetrical image for comparison purposes.

Embodiments of the present general inventive concept provide the hardware and software process(es) necessary to measure undamaged vehicles ahead of time and store the information in an extractable database. The proposed system is configured to measure straight line distances, surface distances, and provide images of the vehicles for comparison in the software to damage sustained on the upper body of an automobile. By having this information readily available in an extractable database associated with the software, the process becomes much more efficient and less costly for the end user than if they had to procure a vehicle and make their own image for comparison.

In the case where a database containing specification data is available, the 3D structured light scanning methodology and technologies described herein enable data to be gathered from an undamaged vehicle and compiled into a database to be used for the correct placement of these critical points when a vehicle is being repaired. The "upper body database" can be incorporated into a software system which, after scanning a damaged vehicle, can be used to compare control point locations and positions in space relative to the correct placement of those points on the control automobile body dimensions provided in the database. The results of the comparison can then be displayed visually and any displacement documented numerically as well, so that both the degree and direction of damage can be assessed as a repair plan is developed and executed.

Currently, underbody or frame specifications are taken or collected by a very laborious and expensive process. To create a single vehicle inspection database, the company taking the measurements typically arranges with a new car dealer to pay a fee for the opportunity to take a new and undamaged vehicle off the dealer site to measure critical points on the frame. After taking the vehicle to the measuring facility, the car is placed on a lift so the technicians can access the underside of the car. Specific control points (i.e., reference points used to establish the dimensions and contour of the automobile frame or under body) are selected over the entire underbody of the vehicle. Typically, somewhere in the range of 20-30 individual points per vehicle are defined and measured.

To obtain measurements for the third dimension (Z or height) an imaginary reference plane is established at a fixed distance below the frame; Z dimension measurements are taken with respect to this plane. If the height/level of the reference plane is established 200 mm below the lowest point on the frame, then the height or Z dimension measurement for each point will be 200 mm plus the distance of the point above the lowest point.

In order to obtain 20-30 measurement points for reference, it is often necessary to remove cover panels in order to access a specific point. These panels are typically part of the automobile body and have been placed to improve aerodynamics or to protect a part of the vehicle from damage. The process of determining which panels to remove, removing them, making a measurement, and replacing the panels is slow and time consuming, and presents the potential for causing damage to a new vehicle. Furthermore, it is also necessary to describe various control points so that they can be identified in the software as a bolt, stud, slot, or hole. The diameter size of each of these points is also defined to facilitate the attachment of magnetic connectors in the repair process. Finally, photographs are taken of each control point to make it easier for a technician to properly identify the point(s) being measured.

However, the specifications gathered in the current approach to underbody database construction are representative of only one undamaged/new vehicle. This is a commonly accepted practice in the industry. However, considering the number of vehicles of any model produced, and the fact that the same model is produced at more than one facility, a single vehicle's dimensions do not provide a reasonable statistical sample size. In contrast, embodiments of the inventive system and methods would allow measurements to be taken during the build process on the assembly line. The information collected could be used in several different ways, as described in greater detail below.

Up to this point we have only discussed the possibility of capturing undamaged vehicle measurements on completely assembled vehicles procured mainly from a car dealership. However, the proposed invention has the capability to take measurements of any aspect of the vehicle during the production process. To take measurements in the production line it would be necessary to use more than one scanner at the same time.

To fully scan the underbody or any other full surface on an automobile, multiple scanners would be required. Each scanner would have its own field of view and this field of view would overlap by approximately 20% the view of a structured light scanner on either side (the adjacent scanners). In the case of an end scanner, it would only overlap the view of one scanner, on the side closest to the middle of the array. Having an overlap in fields of view provides common points of reference for each scanner to its adjoining scanner(s). This would allow the field of view to appear as one continuous scan rather than several individual scans. This can be done to create a statistically valid specification database. Here, the array of scanners can be fixed at a convenient point along the manufacturing assembly line and positioned so that the scan of the array would cover the entire surface of the vehicle presented. In this way, the movement of the vehicle body along the assembly line would provide the motion necessary to scan the length of the vehicle. Field tests have proven this scanning could be performed with an accuracy of 1 mm or less at up to a maximum of 2 feet per second speed of the production line.

In general, these measurements can be taken with respect to two reference lines. One line is considered to be running lengthwise down the center of the vehicle and a second reference line runs across the width of the vehicle at midpoint. Using these two lines, an X, Y coordinate system can be established to describe the location of each measured point relative to these reference lines.

Collecting data during the build/manufacturing process can be implemented as follows. The normal viewing area of a scanner is not sufficient to scan the underbody of a vehicle as it moves down the production line. However, it is possible to "gang" several of the scanners together and scan the entire underbody in a single pass. This is done by having a known or determinable degree of "overlap" in the field of view for each scanner relative to the adjacent scanner(s). By virtue of this overlap, a composite of the entire vehicle can be accurately measured in a single pass. This can be done at a speed of up to 2 feet/second. This value was supplied by the manufacturer of the scanner. A scanner should be capable of processing a vehicle at speed equal to or greater than that of an OEM production line; in most cases, an OEM would not slow the line in order to acquire data.

The gathered information can be used in multiple ways. First, the scan data could be tied to the VIN number of the vehicle scanned. Once tied to the VIN, it would be possible not just to provide a specification for repair of a representative model, but to actually compare a damaged vehicle to its own unique dimensions at the time of manufacture. Second, the data from multiple vehicles can be compiled and statistically analyzed to provide a much more acceptable sample size than the method currently used, which involves measuring one vehicle only. Finally, the data gathered could be utilized by the OEM to monitor wear and tear on dies in the production process that can produce "fit error" and "stack up error" in the manufactured product (as described in greater detail below):

As mentioned above, sheet metal components utilized in modern automobile production are typically manufactured in a stamping process. Stamping involves taking a flat section of gauge sheet metal and forming it into a desired shape by bending it around a set of dies. Typically, the die stamping set has multiple steps to manufacture a component with all of the desired holes, slots, and contours required. Over time the dies used to produce the component wear. The wear on the dies can create an error in the part being fabricated which can cause it to deviate from the original design. The die wear occurs gradually and typically results in incrementally increasing departure from standard or desired sizes. Modern manufacturing techniques recognize this fact and engineering design allows for some degree of deviation in a part. However, at some point the part will not be within the tolerances required to mate with an adjacent panel or mounted mechanical component. This situation causes an error, and the failure is termed a "fit error."

Another type of error that can present a problem in volume manufacturing is that of "stack up error". Stack up error is caused when no single individual component is out of specification by an amount that makes it defective, but the total combined errors in a group of single parts makes the assembly or sub-assembly not adequate for its intended purpose.

By taking the measurements as part of the production line, the process of developing data will be streamlined and become much more accurate, as well as more efficient, thereby reducing costs. A 3D structured light scanner used as described herein will not only locate the reference points, but will also measure the dimensions of the slot, bolt, stud, or hole as the scan is taken. This approach/process would also eliminate the need to remove panels from the underside of the vehicle because the measurements can be taken prior to installation of the panels. Finally, the 3D scan should also eliminate the need for separate point identification photographs, as the 3D structured light image should be sufficient to aid a technician in identifying the points while under the car.

At present, upper body and underbody specifications (if such data was available) are typically, of necessity, treated as two separate entities and nowhere can an information set be found that captures the relationship of the underbody and upperbody control points to each other. One of the challenges is that no such database exists (i.e., one that creates a relationship between upper body and under body points) because until now there was no process capable of producing an upperbody specification, due to limitations of the available technology. However, the proposed 3D structured light scanning process described herein can not only produce the currently unavailable upperbody database, but also has the capability to not only relate upperbody openings and safety devices to each other, but to locate these points with respect to the available underbody points. The ability to combine these data sets is due to the 3D structured light scanner's ability (along with other aspects of the inventive system and methods) to measure other than straight line distances. Thus, a known underbody control point can be located with respect to a known upper body control point (door hinge point for example).

This capability provides a known relationship between the designated underbody control points and other underbody points. The process also provides a known relationship among the upper body control points and the other upper body critical points. Thus, note that once a relationship is established between the upper body control point and the underbody control point, a relationship among all points in both data sets can be established.

With the embodiments of the 3D structured light system and methods described herein, it is possible to relate these two databases to provide a holistic representation of all points to each other. For example, if the two specific control points on the underbody were geometrically referenced to the door hinge points in the upper body and all points on the upper body were referenced to the door hinge points, and all underbody points referenced to the specified points, then by default all upper body and underbody points could be referenced to each other. This type of relationship would present a complete 3D image of the entire vehicle for use in the repair process.

Referring to the figures, in a conventional repair to be done in the absence of a suitable database containing vehicle specifications, the damaged vehicle can be brought into the shop and secured to a frame machine for measuring and repair. An initial step in an upper body repair is to visually inspect the vehicle for damage. If, for example, the passenger side of the vehicle had observable damage; the first step would be to scan the same area on the opposite side of the vehicle (driver side). This can be done because vehicles are almost exclusively symmetrical. That is, scanning the undamaged side of the vehicle gives a comparative image for comparison to the damaged side.

In a next operation, a "mirror image" of the undamaged side of the vehicle can be generated and used as the comparative standard. This is done by a manipulation of the scanned data in the software. When the mirror image has been generated, the damaged side of the car can be scanned, which produces a visual image of that side of the vehicle. The mirror image and damaged image are overlaid in the software, and discrepancies are highlighted by different colours based on the degree of damage. In general, damage within a minor tolerance band will be yellow and any damage above the first tolerance band maximum limit will be red.

This comparison will show not only where the damage is located, but also the degree and direction of damage. Such a comparison will allow the shop to begin formulation of a repair plan and to determine whether to recommend repairing components or replacing them.

After an upper body database is built, the repair process can be somewhat the same. The damaged vehicle would be bought into the shop and mounted on the frame straightening machine. The technician would then first select a specification view of the undamaged passenger side body from our upper body database. This would be done by selecting the year, make, model, and view desired. From that point the process would be the same. After scanning the damaged side of the vehicle, it would be overlaid on the specification image and damage degree and direction would be displayed in the same manner as a symmetrical measurement repair.

While innovative and able to capture upper body vehicle specifications, this technology transforms the manner in which the current underbody specifications are taken. Presently, the methodology used by all companies who produce data for underbody databases is to make a financial arrangement with a new car dealer to take a new vehicle of the most current year off the dealer's property for measurement.

At an offsite facility, points that are critical to the repair process can be measured for their relative location to each other on the frame (x/y/z coordinates). In order to take these measurements, in many instances, protective covers put in place primarily to improve aerodynamics and reduce drag must be removed. Each point is then described as to being a hole, slot, nut, bolt or stud. The diameter and thickness of the bolt heads or length of protrusion on the studs are noted as well. Then, each control point can be photographed to aid the technician in identification when trying to locate this point during the measuring and repair operation.

Performing the total scope of this work and measuring a single model of one vehicle typically involves several people, can take several days, and has the possibility of damaging the vehicle in some manner. For example, the paint can be scratched, wiring broken, removable panels (usually plastic) can be broken. In this case, the measuring company is responsible for making the repair at an additional cost beyond what was paid to "rent" the vehicle for measuring in the first place. Costs for such measuring is excessive.

Measuring a single vehicle does not represent a valid statistical sample from even one manufacturing plant let alone the entire production of a given model at several different manufacturing lines. Additionally, a single vehicle measuring approach, does not take into account wear on dies and the variation this wear introduces over time in a component part. However, ganging these 3D structured light scanners to measure frame control points during the manufacturing process solves several problems and produces data that can be used in multiple ways. First, making a specification for a vehicle and coordinating that set of data with a specific, manufacturing process, allows the information to be assigned to a specific VIN (Vehicle Identification Number), which is an identifier that stays with a vehicle for its entire life cycle. In this manner a specific vehicle's data can be stored in the cloud. When that specific vehicle is involved in an accident, the VIN can be utilized to call up the frame data for that specific vehicle and the vehicle can now be restored to dimensions representative of the model, but more specifically, will allow the vehicle to be restored to the dimensions with which it left the factory.

Taking data in this manner provides several advantages over the present method of making underbody (frame) specifications. One improvement is that even if data specific to a given vehicle is not chosen for use, the ongoing collection of data from the manufacturing process provides a much more accurate data sample size. This data can then be organized in a manner the would allow a Model "X" to have a unique data set for those vehicles manufactured out of a specific facility. This is relevant as today it is a very common occurrence to find that a vehicle manufactured in a US based factory does not have the same frame/suspension/hardware dimensions as the same model vehicle made in a plant in Mexico or even at another US based facility.

Taking data continuously using 3D structured light ganged scanners produces additional benefits over the current methodology. For example, a new vehicle need not be removed from a dealer facility, which saves money in the data collection process. Second, manpower is not required to take the specifications. This eliminates the possibility of mistakes made by humans and reduces the possibility of vehicle damage caused by workers in the process. It can also increase worker safety. In addition, a 3D model scan of the vehicle can be used to produce photographic quality images, which aid the repair technician in the repair process by making point(s) of interest more easily identifiable. Also, data can be available the first day a specific model comes off the production line. Currently there is an interval between the first day a vehicle is produced and when data is available for repair that is a consequence of the current method of taking data from a vehicle off a dealer lot.

The example embodiments of the present systems and methods using 3D structured light scanning technology can also be applied at auto auctions to certify that vehicles being sold through the auction process have no frame damage. This would be particularly useful for vehicles that do not get repaired via the traditional insurance payment process, which is the basis for generating a vehicle condition document such as a Car Fax. Note that this would be of particular value to fleet leasing companies. These companies are typically self-insured and make repairs to damaged vehicles themselves, and do not generate a condition document. Absence of a condition document often causes a rental vehicle sold at auction to sell for substantially less than the same model, mileage, trim vehicle that has a condition document, potentially costing rental companies hundreds of thousands of dollars per year when selling off portions of their fleet.

Additional applications of the present general inventive concept can be found in:

Trailer Axle Alignment.

Consider the trailers pulled behind commercial trucks. These trailers have two axles that, for optimum performance, need to be parallel with each other and perpendicular to the longitudinal center-line of the trailer (i.e., properly aligned relative to each other and to the dimensions of the trailer). If the axles not parallel with each other, out of perpendicular with the trailer center-line, or both, then inefficiencies are created. This is because under such conditions, the tires are not properly rolling across the road surface, but become partially dragged across the surface as they rotate. Thus, the improper alignment (out of parallel/perpendicular conditions) may cause excessive fuel use and also increase tire wear.

Example embodiments of the present general inventive concept can also be configured to determine if the axles are in parallel with each other and perpendicular to the trailer center-line. This may be accomplished, for example, by fixing a target to the trailer kingpin & mounting targets on the trailer axles' ends near the wheels. Triangulating the distance until each side is equal in measurement to the other side of a given axle would mean that the axle was perpendicular to the center-line. Once each axle is located in this manner, they will, by default, be parallel with each other. Verifying these axle alignment issues during routine maintenance exercises would help reduce tire wear and minimize or eliminate excessive fuel use;

Railroad Car Carriage Alignment.

Another use of an embodiment is to align the undercarriage (wheel trucks) on railroad cars. If the axles are not parallel on rail cars or if they are not perpendicular with the center-line of the railcar, then the steel wheel flange rubs on the rail. This wears out the wheel, causing premature wheel failure. A similar system to that described above for aligning/confirming trailer location can be applied to the railroad wheel trucks. This can be performed on some regular basis as part of the maintenance routine.

Embodiments of the present general inventive concept can also be applied to enhance security at locations or buildings of interest to federal government where buildings, locations, regions, borders, etc. are subject to heightened security. Here, locations for the scanning system might include Federal (U.S.) property such as, but not limited to, consulates, military bases, research facilities, points of entry and exit from US borders, Federal buildings, Federal Institutions, etc. Thus, embodiments of the invention can enhance protection and overall security whenever a vehicle or other form of transport is guided/directed onto Federal property or any area of Federal interest.

Current methods or approaches utilize a visual inspection carried out by a human inspector—this may include the use of one or more of a canine (K9), mirrors, flashlights, etc. to identify an inconsistency in the appearance of the underbody, axle, carriage, etc. suggesting an anomaly or suspicious item (such as a hidden package or item, a modified element of the vehicle suggesting a hiding space or possible use for transporting contraband or an explosive device). This may be used in conjunction with driver and/or passenger interview(s) to find inconsistencies in explanations for a trip or an aspect of the vehicle.

In contrast, in some embodiments of the 3D structured light scanning system described herein, each vehicle or transport can drive over sensors or an array of sensors that have been recessed in the ground or in a channel or structure (such as a slightly elevated path) over which the vehicle is driven in order to scan the underbody of the vehicle or transport. The sensors or sensor array can operate to generate a scan of the underbody and an image generated from that scan (possibly along with data obtained from the scan) is provided to a human inspector. If the human inspector identifies a concern or issue, the generated image, data and any notes or comments may be passed to another inspector (at the same or another location) for further analysis and investigation.

In some embodiments, the scanned image and/or related data may be compared to corresponding date obtained from a database containing OEM specifications for the year, make, and/or model of the vehicle or transport. Comparison or analysis between the data used to generate the scanned image (or the image itself) and the OEM specification data (or a corresponding image) may be performed by a suitably programmed data processor or device (such as a processor programmed with a set of computer-executable instructions) to compare the scanned underbody and/or data collected by the scanning process to the actual OEM specs and in doing so, detect modifications, hidden items, alterations to the expected dimensions, appearance, indentations, etc. In some embodiments, this may include the determination of one or more dimensions or characteristics of the vehicle or transport from the OEM data and/or from the scanned data or image.

Machine learning using a suitable set of training data on similar vehicles, transports, tires, wheels, mirrors, attachments, etc. may be used to assist in identifying alterations, modifications, or otherwise suspicious elements or structures—this may be combined with photographs, other forms of scans, etc. to assist in the identification. Due to the ability of such devices to measure surface dimensions in addition to straight line dimensions, the inventor recognized that an upperbody database (which was needed, but non-existent) could be created using the example embodiments described herein. Further, the 3D structured light scanner could be positioned/utilized in a manner that would allow existing underbody control point data to be spatially related to the 3D generated upper body control points in the upperbody database. Additionally, the structured light scanner could be used to measure "in cabin" control points and relate them spatially to the upperbody & underbody control points.

One of the advantages of the present solution regarding the application of a 3D structured light scanning device is the ability to relate the physical dimensions of every vehicle to spatial coordinate systems commonly utilized in the collision repair industry. Additionally, the measured/collected data needs to be processed by "user friendly" software, and use displays and user inputs that permit a technician of normal skill and training to effectively use the system.

The software that is standard with a commercially available 3D structured light scanner is used primarily for reverse engineering and is quite cumbersome, even though it is simply capturing measurements to recreate or analyze a given physical part. In contrast, in order to make the 3D structured light scanner a viable tool for use in analysing damage sustained by an automobile in an accident, the software not only must capture the dimensions of the vehicle, but also be specifically configured to compare the actual "as measured" damaged dimensions to a selected standard baseline. The control system software can utilize a minimum of two different types of baseline measurements; those contained in a database which would be part of the operating software, or if no data is available, dimensions taken from an undamaged section of the vehicle being repaired. Further, the existing software can be modified to accept available data for a specific vehicle make, model, trim & year of manufacture.

In order to address the aforementioned requirements, the commercial (existing) software provided can be modified to relate measured damage (whether taken from a database accessed within the system or from measuring an undamaged portion of the vehicle) to an X, Y, Z coordinate system utilized as an industry standard. The existing software can also be modified to take "as measured" undamaged vehicle components and "mirror image" (i.e., flip, rotate, translate as needed) those measurements for comparative use as a baseline for calculating the magnitude of displacement of a damaged part or region of the vehicle. Also, no matter whether the system is using data taken from an undamaged part of the vehicle or from a database, it is configured to illustrate, both numerically and visually, the degree and direction of damage at each discrete point of interest, as well as in the composite.

In order to accomplish the above tasks, in some embodiments, the software cam be modified to accept either "as measured" dimensions or software database contained dimensions, and convert those to an industry standard format. The software can also be modified to display the comparative damaged measurements in numeric and visual formats or presentations. This comparison is important to developing the repair plan for the vehicle or for determining that the vehicle damage is beyond economical repair guidelines. The scope of work needed to accomplish the changes or modifications to the existing commercially available 3D structured light software can involve significant modification to the existing software code. These modifications can include deletion of extraneous code, modification of existing code, and integration of several subroutines to make the software more user friendly for technicians of normal skill level and knowledge. In addition, the software can be modified to work with an existing underbody database of vehicle specifications plus incorporate data updates, which are issued multiple times per year.

Example embodiments of the present general inventive concept can be achieved using a set of structured light scanners as described herein to collect data during the manufacturing process to form a specification database, which may be referred to later by repair shops—also, that a scanner array could tie the "manufacturing scan' to a VIN number and provide a specification data set specific to a vehicle, so that the car could be compared to its own "footprint" rather than to a generic specification. Additionally, "manufacturing scans" can make data available immediately and eliminate the "dead period" between when a vehicle comes off the assembly line and when it is measured and entered into a database. This "scanning in process" makes data available more quickly and less expensively, most likely cutting cost of acquiring data by 50% or more. Further, one such scanner and the use of software configured to mirror data can be used to create a full data set for a specific vehicle and thus could be used to improve repairs.

At present there is no way to accurately measure the curvature of the upper body surfaces. All that happens currently is that a technician looks at a static outline of an opening (door, window, trunk, etc.) and manually measures the opening on the vehicle and compares measurements to the PDF outline from the manufacturer; and the process flows 1-3 illustrated in FIGS. 2(a) and 2(b) represent the inventor's recognition that 3D structured light scanners of the correct type can be used to measure the curvature of modern automobile surfaces and assist in generating a database that does not exist at present. The inventive system and methods can relate the under body, upper body, & "in cabin" control points to each other. This effectively allows "measurement around corners" to provide a comprehensive model of all control points on the vehicle.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. The computer-executable code or set of instructions may be stored in (or on) any suitable non-transitory computer-readable medium. In general, with regards to the embodiments described herein, a non-transitory computer-readable medium may include almost any structure, technology or method apart from a transitory waveform or similar medium.

As described, the system, apparatus, methods, processes, functions, and/or operations for implementing an embodiment of the invention may be wholly or partially implemented in the form of a set of instructions executed by one or more programmed computer processors such as a central processing unit (CPU) or microprocessor. Such processors may be incorporated in the circuitry and components of an apparatus, server, client or other computing or data processing device operated by, or in communication with, other components of the system. As an example, FIG. 6 is a diagram illustrating elements or components that may be present in a computer device or system 500 configured to implement a method, process, function, or operation in accordance with an embodiment of the invention. The subsystems shown in FIG. 6 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

Figure 7:
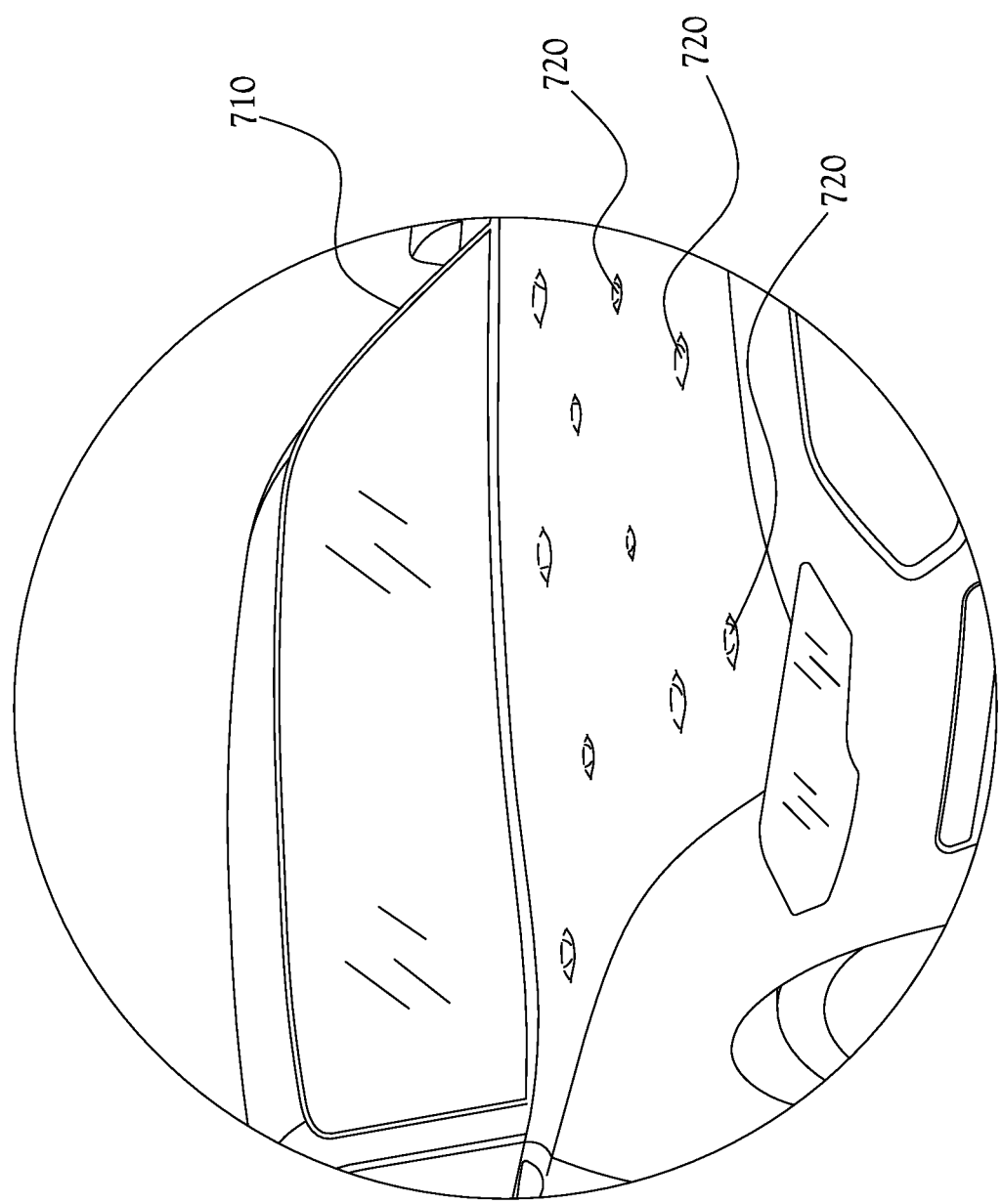
FIG. 7 illustrates some typical hail damage to a motor vehicle.
Figure 8:
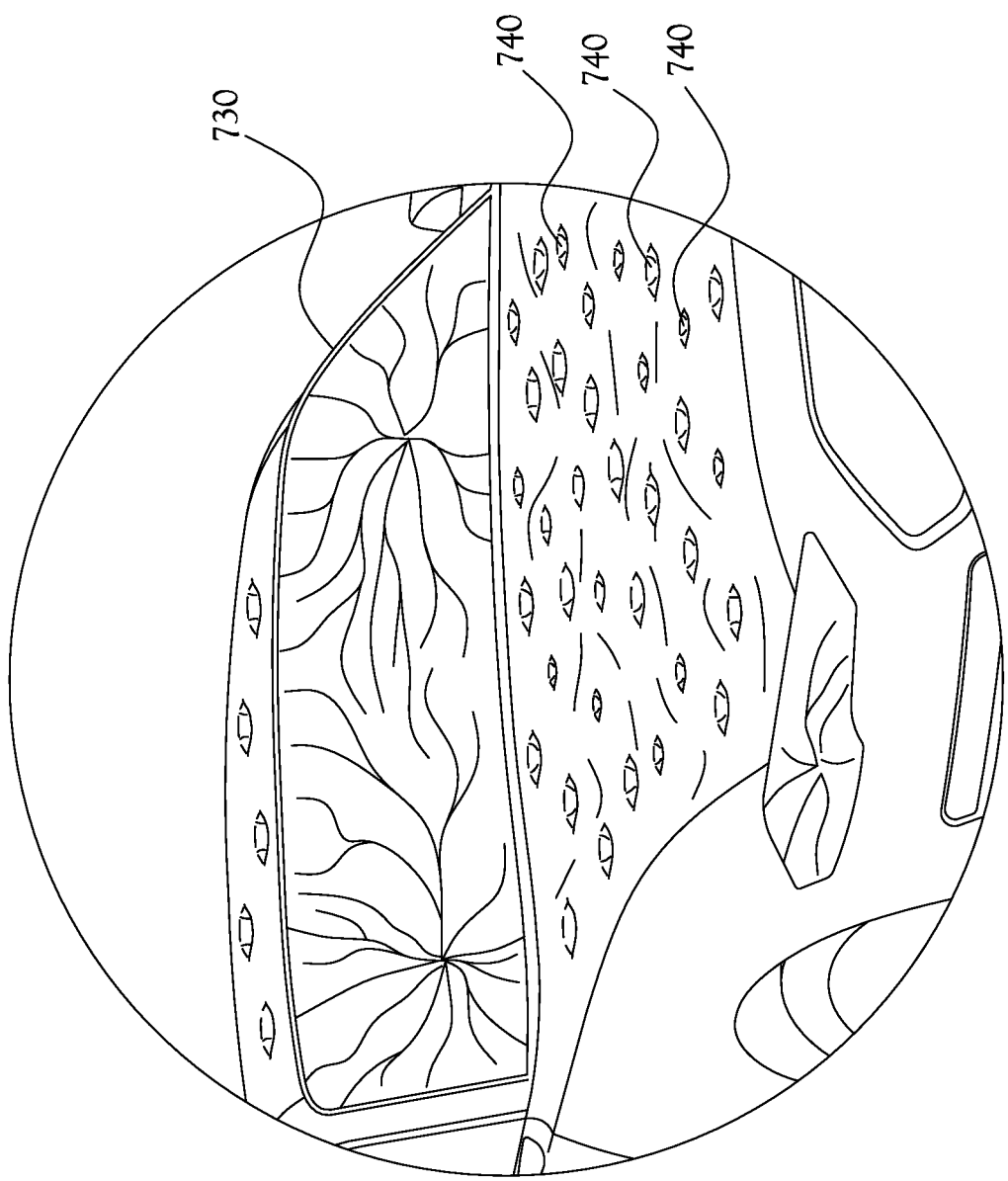
FIG. 8 illustrates more severe hail damage to a motor vehicle.

The 3D structured light scanner system described herein may be used to detect a variety of different types of damage to a motor vehicle. For example, various example embodiments of the present general inventive concept may also provide a structured light scanner system and method of mapping structural points of a motor vehicle to estimate the extent of hail damage to the motor vehicle. Hail damage to motor vehicles is a multi-million dollar annual expense for insurance companies across the United states, and presents a very difficult problem for the insurance companies to estimate for repair. While finding the damage to the motor vehicle exposed to hail may be relatively straightforward in some cases, the difficulty lies in quantifying the problem of the hail damage. In some cases the estimate is entirely subjective, with a dealer merely describing the damage as they see it, and sending a photograph to the insurance company. While such photographs may display the cosmetic effect from the hail, there is no objective method for measuring the damage. Figure illustrates some typical hail damage to a motor vehicle. As illustrated in FIG. 77, a motor vehicle 710 has a host of "divots" 720 formed on the hood of the motor vehicle, the divots 720 being formed of various sizes, depths, shapes, etc., due to the size of hailstone, angle of impact, and so on. It is noted that the term "divots" is used generally as a dent or other such deformation made in the motor vehicle body by a hailstone. When a dealer, insurance agent, or other observer sees such a photo, it is uncertain whether any of them would consider what they see moderate or severe hail damage. FIG. 8 illustrates more severe hail damage to a motor vehicle. As illustrated in FIG. 88B, a motor vehicle 730 has a great many divots 740 that have caused extensive damage to the body of the vehicle. The vehicle 730 in FIG. 8 is obviously much more hail damaged than the vehicle 710 shown in FIG. 7. While the hail damage in FIG. 7 may look severe, especially to the vehicle owner, the damage shown in FIG. 8 completely changes the definition of severe hail damage.

Figure 9:
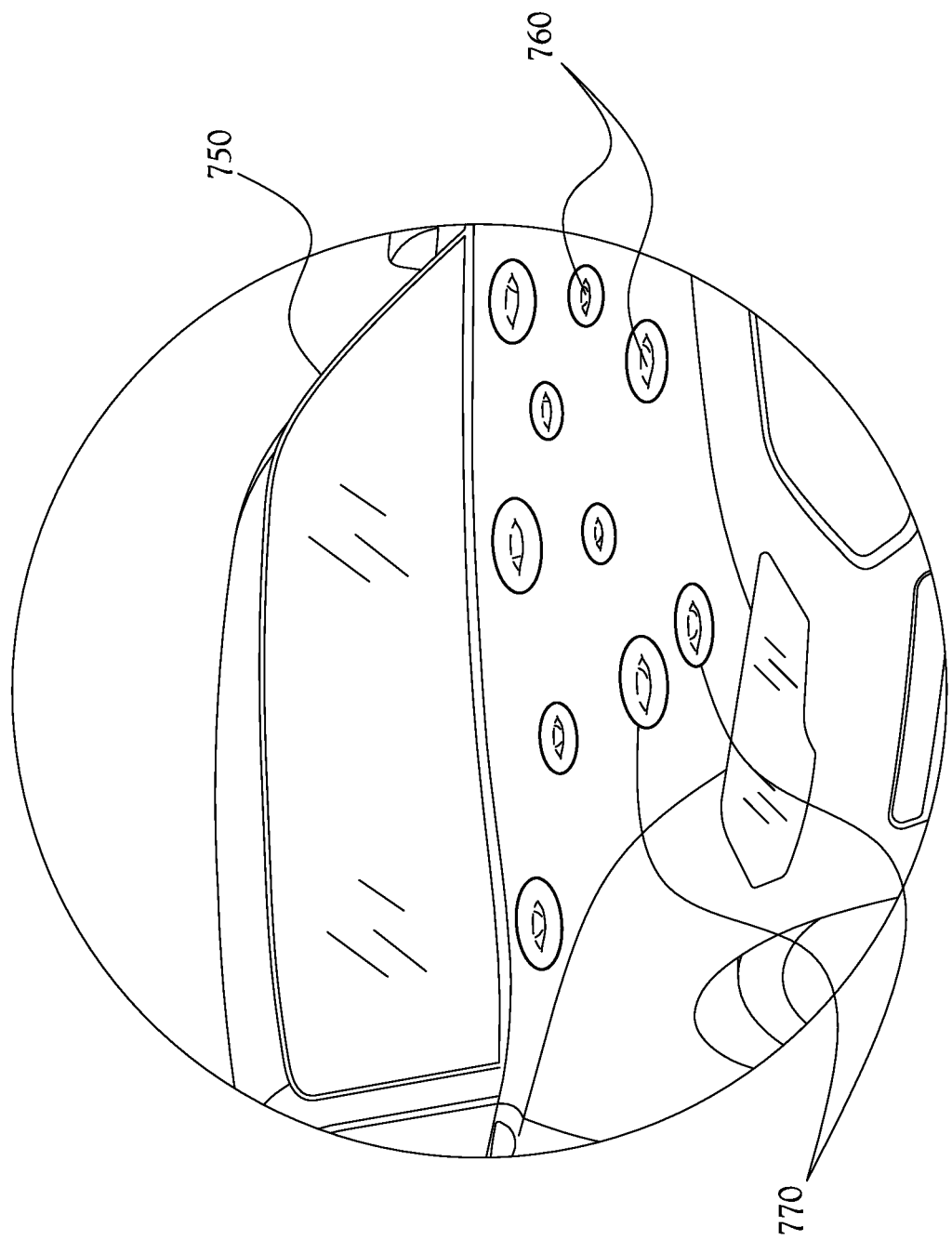
FIG. 9 illustrates a conventional manual estimate of hail damage to a motor vehicle.

In an effort to quantify the description of hail damage, and to create more realistic and equitable estimates, some insurance companies have tried an approach shown in FIG. 9. FIG. 9 illustrates the results of a conventional manual estimate of hail damage to a motor vehicle. As illustrated in FIG. 9 a person has manually drawn circles 770 around the hail damage divots 760 on a motor vehicle 750. The individual divots 760 caused by the hailstones are measured for diameter. After measuring the diameter of the divots 760, the number of divots 760 are classified based on the measured diameter. While such steps as these may help in adding some objectivity to the estimate, the photograph and measured diameters do not tell the entire story of the hail damage. One problem with such a method is that the diameters measured only account for measurement in the horizontal dimension, while hail damage does not happen in only one dimension. Hail damage points also present a depth issue. When repairing hail damage, it can be easier to repair a large diameter but "shallow" divot than it is to repair a smaller diameter divot that has more depth. Additionally, there is also the issue of the paint that is affected by the hail damage. A divot may or may not exhibit damage to the paint job. If a divot has damaged the vehicle's paint, then that issue must be factored into the repair cost equation. Thus, in order to perform all of the above tasks and calculations the insurance company must send an adjuster to the residence or shop at which the damaged vehicle is located.

Various example embodiments of the present general inventive concept provide a system that uses the 3D structured light measuring system to estimate hail damage to a motor vehicle, which eliminates all of the "guesstimation" by providing objective measurements. In various example embodiments a single scan with the 3D structured light measuring system can measure the diameter of all the hail damage divots, and calculate how much surface area has been affected by a single hail stone. The 3D structured light measuring system can also measure the depth of the individual divots, which is nearly impossibly by manual means. After determining these measurements, the individual damage points can be assigned a numerical value based on the measured deformities in the respective damage points. Once all the divots have been assigned a "damage value" based on area covered, depth, and paint damage, a cost of repair can be assessed very accurately. Having all of this accurately measured information allows for a variety of objective assessments. Individual divots can be categorized based on diameter. For example, divots with diameters of ⅛" to ¼" may be classified as "level one" damage, unless the depth of the damage is greater than 0.125", in which case the same diameter damage may be classified as "level two." Such extremely accurate measurement information could then be put into a matrix that would make estimation much more accurate and objective, and could be used in an industry standard for measuring hail damage.

Typically, the most commonly and severely damaged areas of a vehicle are the roof, hood, and trunk lid. The 3D structured light measuring system according to various example embodiments of the present general inventive concept can also be used to measure the area of any of those portions of a motor vehicle, then the cumulative area of the measured divots could be compared to the area of the damaged hood, for example, and the determined damage could be displayed as a percentage of the total area. In some example embodiments the repair cost could then be determined by the calculated percentage. Also, when the light scanner or measuring system measures each divot of the hail damage, it can provide visual evidence of paint damage, which can be factored into the estimate. The insurance companies could then conveniently and efficiently use these measurements without the need for sending an estimator to the vehicle site.

Insurance companies could require body shops to have some number of personnel trained to use the 3D structured light scanner properly, and the scanner could then be leased or loaned to a body shop convenient to the vehicles needing to be scanned for hail damage. Once the scans are completed, they could simply be emailed, or otherwise conveyed, to the insurance companies. Leasing/renting the scanners could also generate some revenue for the insurance company to offset a part of the repair cost. Paint-less dent repair companies could offer this form of damage estimation as part of their service for a fee. Paying a small estimation fee would be much more attractive to insurance companies than paying travel expenses for an onsite estimator. With insurance companies having the available data from the 3D scanners in house, it would greatly reduce or eliminate the need for supplements to the original damage estimate that often occurs when divots are missed or incorrectly documented. Using 3D structured light scanning, in various example embodiments thresholds could be established such that when a specified percentage of the measured surface area is damaged, the corresponding hood, trunk lid, etc., could automatically qualify for replacement. For example, a measured 75% of hood damage could qualify for automatic replacement of the hood. Guidelines could also be established such that if a defined number of divots of a specified degree of severity (for example, Level 4 of 5) occur on a trunk or hood or other such portion, then that portion could automatically qualify for full part replacement. Post-repair scans can be compared to pre-repair scans to confirm that all individual divots have been repaired.

Figure 10A:
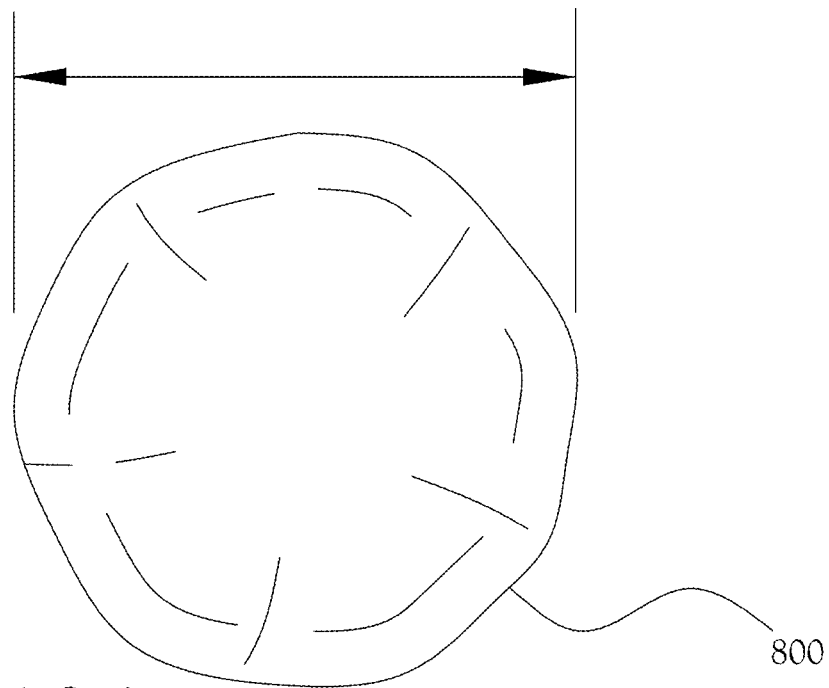
FIGS. 10A-B illustrate some of the hail divot measurements that may be determined by a system and method according to an example embodiment of the present general inventive concept.
Figure 10B:
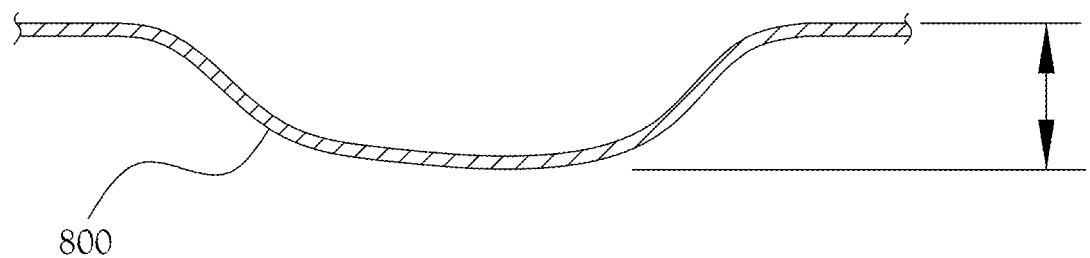

FIGS. 10A-B illustrate some of the hail divot measurements that may be determined by a system and method according to an example embodiment of the present general inventive concept. FIG. 10A illustrates a top view of a hail damage divot 800, and FIG. 10B illustrates a cross section of the divot 800. As illustrated in FIG. 10A, the 3D structured light scanner can be used to measure the diameter of the hail divot 800. As illustrated in FIG. 10B, the depth of the divot 800 is also measured. According to various predetermined thresholds, a damage value is assigned to the divot according to the severity of both of those measurements. In various example embodiments the system may be configured to measure the diameter of the divot across multiple directions, and to determine an overall representative diameter for an irregularly shaped divot. Similarly, the depth of the divot can be determined at multiple points in various example embodiments to allow for a more accurate assessment of the overall damage in each divot.

Figure 11:
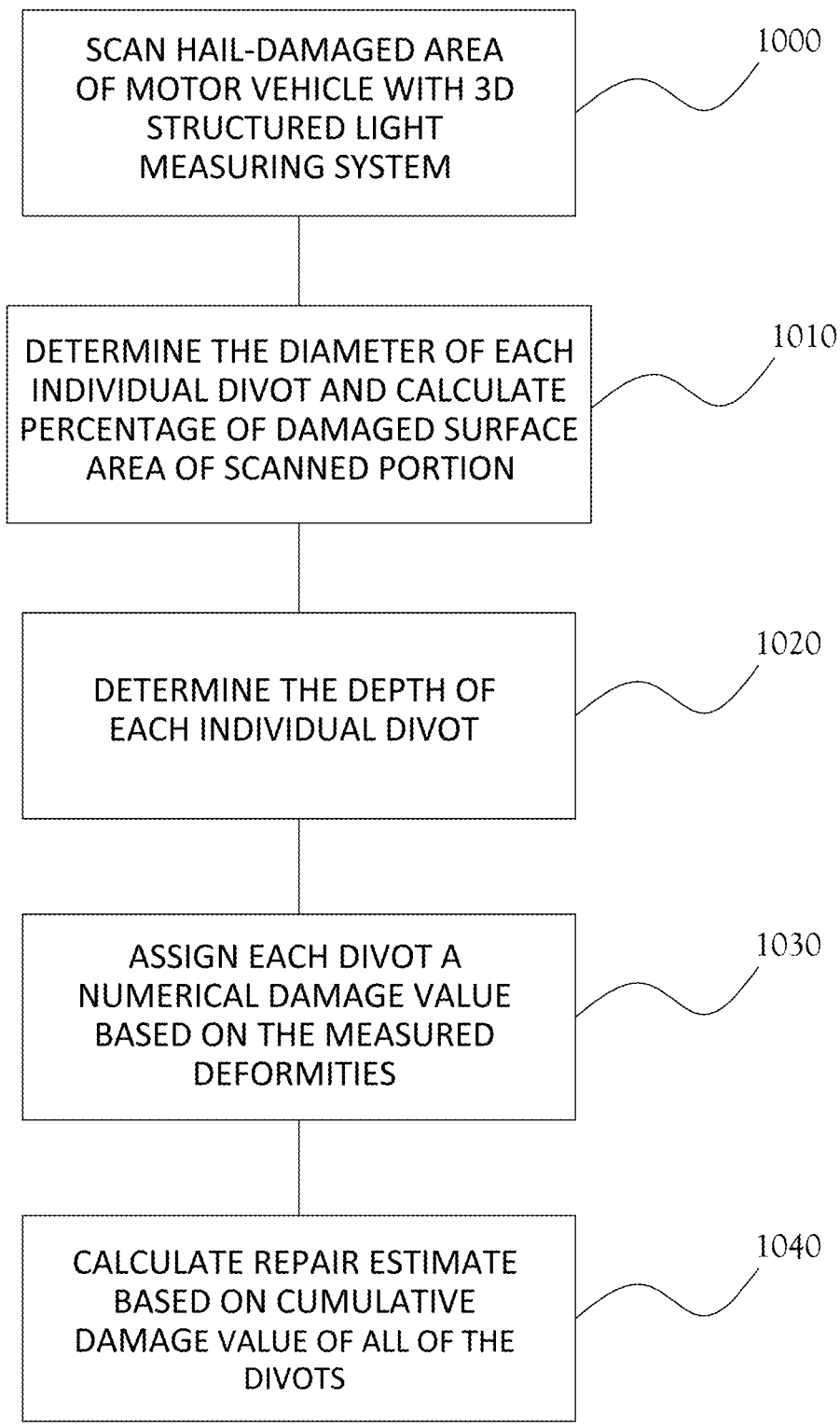
FIG. 11 is a flow chart illustrating a method of estimating hail damage according to an example embodiment of the present general inventive concept.

FIG. 11 is a flow chart illustrating a method of estimating hail damage according to an example embodiment of the present general inventive concept. It will be understood that various example embodiments may include more or fewer operations, and/or operations that may be performed differently than those illustrated in this flow chart. As illustrated in FIG. 11, in operation 1000 a 3D structured light measuring system or scanner is used to scan an area of a hail-damaged motor vehicle. In operation 1010 the diameter of each divot is measured, and these measurements are used to determine how much of the total surface area of the damaged portion of the vehicle has been affected. In operation 1020 the depth of each individual divot is measured. In operation 1030 each divot is assigned a numerical damage value based on the measured deformities of the respective divots. In operation 1040 a repair estimate is determined based on the cumulative damage values of all of the divots. In various example embodiments the repair estimate can be automatically sent to the insurance company via, for example, email. Thus, in various example embodiments the same 3D structured light measuring system used for scanning collision damage can be configured with software or other such control module to perform the hail damage estimate. Various example embodiments provide such a system in a handheld, and thus easily and conveniently portable, housing.

According to the Insurance Information Institute, damage related to hailstorms costs between $8 billion and $14 billion every year. Texas sees the most impact of any state in the country, with Colorado in a close second. Comprehensive car insurance, including hail damage car insurance, typically covers damage to your car from non-collision events. These are things like a falling tree, hitting an animal, or a weather-related incident. But filing a claim can be complicated. And any missteps can leave one dealing with a lengthy restoration process or haggling with an insurance company for payment. Hailstones can range in size from about ¼ inch to over six inches. They can weigh over a pound and travel at speeds of up to 100 miles per hour. It is easy to see how hail damage can total a vehicle. If one has comprehensive coverage on their policy, it will almost certainly cover hail damage, but it's a good idea to double-check. Some policies exclude weather-related events and require a special "wind coverage," especially in areas prone to hailstorms.

The process typically works like this: an insured party files a claim with their car insurance. Then the insurance company assigns an agent (adjuster) to assess the damage to the vehicle. They may recommend a body shop work on the car. If possible, the insured party may want to have paintless dent repair, but the insured party has the right to choose any repair business to repair done to the vehicle. Traditional repair methods bang out the dent as much as possible, then use putty to smooth out the surface. Once the filler dries, the area must then be sanded and repainted. Paintless dent repair uses special machines to return the surface to its original form. For this reason, the damage doesn't appear on accident reports, because it was reversed, not fixed.

When an insurance adjuster makes an initial assessment of the damage, he or she may miss something. When this happens, the body shop writes an auto insurance supplement to pay for the difference in the repair cost. This is not uncommon, but it is problematic because it creates a back-and-forth between the insured party, the adjuster, and the technicians doing the repairs. The insured party wants their car restored to its pre-storm condition. But the insurance company wants the repairs to be done as cheaply as possible. Next, the damage may be more significant than owner thinks. Dents and dings can be difficult to fix, and can be very expensive to fix. In fact, the average hail claim is around $6,500. This could translate to greater loss in the future when the car is sold. If the owner carries comprehensive insurance, the car is probably in pretty good shape already. Hail damage can dramatically lower the value of the car, so the owner is motivated to put the insurance to use and have it fixed, for which the owner will be grateful down the road.

Typically, if the hail stones did not damage the vehicle's paint, it may be a suitable candidate for paintless dent repairs (PDR). A faster and much more affordable alternative to conventional, invasive repairs that fill in and paint over dents, PDR work involves patient metalworking to restore the frame to its original shape. It's even preferred by insurance companies as the primary method to repair vehicle hail damage and dents without paint damage present. The cost of paintless dent repairs to fix hail damage will depend on a few factors. The number of dents caused by hail, as well as the size, depth and location of each dent will determine how much time it will take for repairs. Costs will depend on the extent of the hail damage, whether or not the vehicle's paint has been compromised, and the repair shop selected. It is recommended to seek out a reputable PDR shop for a free estimate to determine if PDR or conventional repairs are needed. If the vehicle owner has comprehensive coverage before the damage happens, the hail dent repair costs are likely covered (after payment of a pre-determined deductible). Comprehensive coverage typically pays for damage or theft occurring outside of collisions, covering expenses like windshield repair, hail damage repair, and damage from theft or vandalism. Comprehensive auto insurance plan premiums vary by state, and may be higher in states like South Dakota or Colorado, which are among the highest for hail damage claims. Yet, without coverage, it can get expensive to pay out of pocket in entirety to fix dents from hailstorms. The vehicle owner's insurance rates generally will not go up if the owner files a hail damage claim, and the insurance company may even pay for loaner vehicle costs while the car dent repair is being done. It's important to file a claim as soon as hail damage occurs. If the vehicle owner fails to repair hail damages when they first occur, the insurance company may deny future claims if previous damage exists. If the car is considered totaled, meaning the cost to fix the hail damage exceeds the value of the car, comprehensive coverage will be denied for the dent removal cost.

Various example embodiments of the present general inventive concept may provide a system of mapping structural points of a motor vehicle, the system including one or more structured light scanners configured to scan at least one area of a motor vehicle to determine a plurality of structural location points relative to structural deformations caused by hail damage in three-dimensional space representing the at least one area, and a processor configured for assembling the plurality of structural location points to measure a surface area of each of the structural deformations, the processor being configured to assign a first numerical value to each structural deformation representing an amount of the surface area of each of the structural deformations, and to estimate total damage to the at least one area based on a summation of the first numerical values. The processor may be configured to measure a depth of each of the structural deformations, to assign a second numerical value to each structural deformation representing a depth of the respective structural deformations, and to estimate the total damage to the at least one area based on the summation of the first and second numerical values. The first and second numerical values may each be based on a predetermined range of measurements of the respective surface area and depth of the structural deformations. The processor may be configured to estimate a cost of repair of the at least one area due to the estimated total damage. The processor may be configured to recommend replacement of the at least one area if the estimated total damage is higher than a predetermined maximum total damage. The processor may be configured to determine a percent of the total area that is affected by the measured surface area of all of the structural deformations. The one or more structured light scanners may be configured to capture visual images of paint damage associated with the structural deformities.

Various example embodiments of the present general inventive concept may provide a method of mapping structural points of a motor vehicle, the method including scanning, with one or more structured light sensors, at least one area of a motor vehicle to determine a plurality of structural location points relative to structural deformations caused by hail damage in three-dimensional space representing the at least one area, assembling the plurality of structural location points to measure a surface area of each of the structural deformations, assigning a first numerical value to each structural deformation representing an amount of the surface area of each of the structural deformations, and estimating total damage to the at least one area based on a summation of the first numerical values. The method may further include measuring a depth of each of the structural deformations, assigning a second numerical value to each structural deformation representing a depth of the respective structural deformations, and estimating the total damage to the at least one area based on the summation of the first and second numerical values. The first and second numerical values may each be based on a predetermined range of measurements of the respective surface area and depth of the structural deformations. The method may further include estimating a cost of repair of the at least one area due to the estimated total damage. The method may further include recommending replacement of the at least one area if the estimated total damage is higher than a predetermined maximum total damage. The method may further include determining a percent of the total area that is affected by the measured surface area of all of the structural deformations. The method may further include capturing visual images of paint damage associated with the structural deformities. The method may further include automatically transmitting a report of the estimated total damage to a remote location.

Various example embodiments of the present general inventive concept may provide a system of mapping structural points of a motor vehicle, the system including structured light scanners configured to scan at least one area of a motor vehicle to determine a plurality of structural location points relative to one another in three-dimensional space representing the at least one area, the at least one area including at least one sensor location of at least one sensor, and a processor configured for assembling the plurality of structural location points and the at least one sensor location into a first map of the at least one area of the motor vehicle, the processor being configured to calibrate the at least one sensor location to orientation and field of view points of the at least one sensor, and to compare the orientation and field of view points of the first map to a baseline map including baseline orientation and field of view points to determine deviation between the orientation and field of view points of the first map and the baseline orientation and field of view points of the baseline map. The one or more structured light scanners may be configured to scan the at least one area of the motor vehicle after the at least one area has been damaged, and the processor may be configured to determine the deviation between the structural location points of the first map and the baseline map by determining the magnitude and direction of the damage. The one or more structured light scanners may be configured to scan at least one area of a first motor vehicle to determine a plurality of first structural location points relative to one another in three-dimensional space representing the at least one area, and the processor may be configured to assemble the first structural location points into a baseline map of the at least one area of the first motor vehicle, the baseline map being configured for comparison to a plurality of second structural location points representative of a corresponding area of a second motor vehicle, the second motor vehicle being representative of the first motor vehicle, and to determine deviation between the first structural location points and the second structural location points of the first motor vehicle and the second motor vehicle, respectively. If the deviation is determined to be above a predetermined threshold, the processor may be configured to generate an alert that the predetermined threshold has been exceeded. The system may further include a memory to store a library of baseline maps corresponding to a plurality of different motor vehicles, and the processor may be configured to compare the first map to a selected baseline map. The processor may be configured to associate the first map with a vehicle identification number (VIN) of the motor vehicle. The processor may be configured for measuring and collecting control point data for both upperbody and underbody surfaces of the motor vehicle as the motor vehicle is processed down the production line based on a plurality of statistical sampling data sets. The one or more structured light scanners may include a plurality of structured light scanners configured to scan various parts of the motor vehicle as it is progressed on the production line, and the scanning may include grouping the plurality of structured light scanners such that each of the structured light scanners overlap in scanning area a predetermined distance with any adjacent ones of the structured light scanners. The processor may be configured for capturing individual control point data for an upperbody and an underbody of the motor vehicle during production, and matching the individual control point data to a vehicle identification number (VIN) of the motor vehicle. The system of claim 6, wherein the processor is configured to relate scanned upper body specifications, sensor locations, upper body control points, or any combination thereof, of the motor vehicle numerically and dimensionally to underbody frame dimensions of the motor vehicle in the first map. The processor may be configured for comparing stored visual maps of multiple scanned motor vehicles of a common make to determine whether variances in locations of one or more control points are within predetermined tolerances. The processor may be configured to generate a comparison map based on the deviation between the first map and the baseline map, and including color shading to indicate degrees of damage. The processor may be configured for assembling of the plurality of structural location points into the first map by systematically linking groups of the structural location points to other groups of the structural location points to form a complete upperbody of the motor vehicle. The processor may be configured to indicate straight line distances and/or surface contour differences between control points on the motor vehicle in the assembling of the first map. The processor may be configured for assembling the first map by setting a first axis running lengthwise down a center of the motor vehicle, a second axis running across a width of the motor vehicle at a midpoint between front and rear, and a third axis at a fixed distance below a frame of the motor vehicle. The processor may be configured to generate a comparison map based on the deviation between the first map and the baseline map, and to generate a repair cost estimate based on the comparison map.

Various example embodiments of the present general inventive concept may provide a method of mapping structural points of a motor vehicle, the method including scanning, with one or more structured light scanners, at least one area of a motor vehicle to determine a plurality of structural location points relative to one another in three-dimensional space representing the at least one area, the at least one area including at least one sensor location of at least one sensor, and assembling the plurality of structural location points and the at least one sensor location into a first map of the at least one area of the motor vehicle, calibrating the at least one sensor location to orientation and field of view points of the at least one sensor, and comparing the orientation and field of view points of the first map to a baseline map including baseline orientation and field of view points to determine deviation between the orientation and field of view points of the first map and the baseline orientation and field of view points of the baseline map. The first map may correspond to a damaged side of the motor vehicle, and the method may further include assembling the baseline map by scanning, with the one or more structured light scanners, at least one area of an undamaged side of the motor vehicle that corresponds to the scanned at least one area of the damaged side of the motor vehicle, mirroring a plurality of structural location points scanned on the undamaged side of the motor vehicle to assemble the baseline map so as to be representative of the scanned at least one area of the damaged side of the motor vehicle without damage, and overlaying the first map and the baseline map to generate a comparison map depicting damage and displaced structural location points on the damaged side of the motor vehicle. The first map may correspond to a damaged first motor vehicle, and the method may further include assembling the baseline map by scanning, with the one or more structured light scanners, at least one area of an undamaged second motor vehicle that corresponds to the scanned at least one area of the damaged first motor vehicle, and overlaying the first map and the baseline map to generate a comparison map depicting damage and displaced structural location points on the damaged first motor vehicle. The baseline map may be associated with one or more previously scanned vehicles moving past the one or more structured light scanners on a production line, and the first map may be associated with a subsequently scanned vehicle moving past the one or more structured light scanners on the production line, and the method may further include generating a notification in response to the deviation exceeding a predetermined threshold.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus, and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented, or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the invention.

The invention claimed is:

1. A system of mapping structural points of a vehicle, comprising:
   one or more structured light scanners configured to scan at least one area of a vehicle to determine a plurality of structural location points relative to structural deformations caused by hail damage in three-dimensional space representing the at least one area; and
   a processor configured to assemble the plurality of structural location points to measure a surface area of each of the structural deformations, the processor being configured to assign a first numerical value to each structural deformation representing an amount of the surface area of each of the structural deformations, and to estimate total damage to the at least one area based on a summation of the first numerical values in the absence of a database of sample data corresponding to the vehicle.

2. The system of claim 1, wherein the processor is configured to measure a depth of each of the structural deformations, to assign a second numerical value to each structural deformation representing a depth of the respective structural deformations, and to estimate the total damage to the at least one area based on the summation of the first and second numerical values.

3. The system of claim 2, wherein the first and second numerical values are each based on a predetermined range of measurements of the respective surface area and depth of the structural deformations.

4. The system of claim 1, wherein the processor is configured to estimate a cost of repair of the at least one area due to the estimated total damage.

5. The system of claim 1, wherein the processor is configured to recommend replacement of the at least one area if the estimated total damage is higher than a predetermined maximum total damage.

6. The system of claim 1, wherein the processor is configured to determine a percent of the total area that is affected by the measured surface area of all of the structural deformations.

7. The system of claim 1, wherein the one or more structured light scanners are configured to capture visual images of paint damage associated with the structural deformities.

8. The system of claim 1, wherein the processor is configured to estimate total damage to the at least one area based on symmetrical measuring.

9. A method of mapping structural points of a vehicle, the method comprising:
   scanning, with one or more structured light sensors, at least one area of a vehicle to determine a plurality of structural location points relative to structural deformations caused by hail damage in three-dimensional space representing the at least one area;
   assembling the plurality of structural location points to measure a surface area of each of the structural deformations;
   assigning a first numerical value to each structural deformation representing an amount of the surface area of each of the structural deformations; and
   estimating total damage to the at least one area based on a summation of the first numerical values in the absence of a database of sample data corresponding to the vehicle.

10. The method of claim 9, further comprising measuring a depth of each of the structural deformations, assigning a second numerical value to each structural deformation representing a depth of the respective structural deformations, and estimating the total damage to the at least one area based on the summation of the first and second numerical values.

11. The method of claim 10, wherein the first and second numerical values are each based on a predetermined range of measurements of the respective surface area and depth of the structural deformations.

12. The method of claim 9, further comprising estimating a cost of repair of the at least one area due to the estimated total damage.

13. The method of claim 9, further comprising recommending replacement of the at least one area if the estimated total damage is higher than a predetermined maximum total damage.

14. The method of claim 9, further comprising determining a percent of the total area that is affected by the measured surface area of all of the structural deformations.

15. The method of claim 9, further comprising capturing visual images of paint damage associated with the structural deformities.

16. The method of claim 9, further comprising automatically transmitting a report of the estimated total damage to a remote location.

* * * * *